US 6,745,252 B1

(12) United States Patent
Yanagawa et al.

(10) Patent No.: US 6,745,252 B1
(45) Date of Patent: Jun. 1, 2004

(54) NETWORK CONTROL SYSTEM, CONTROLLER, AND DEVICE

(75) Inventors: Yoshifumi Yanagawa, Kyoto (JP); Hidetoshi Takeda, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/462,675

(22) PCT Filed: May 13, 1999

(86) PCT No.: PCT/JP99/02464
§ 371 (c)(1),
(2), (4) Date: Jan. 11, 2000

(87) PCT Pub. No.: WO99/59374
PCT Pub. Date: Nov. 18, 1999

(30) Foreign Application Priority Data

May 13, 1998 (JP) ............................................ 10-129879
May 26, 1998 (JP) ............................................ 10-143879

(51) Int. Cl.[7] ................................................ G06F 3/00
(52) U.S. Cl. ............................. 710/8; 709/204; 709/223; 709/229; 709/231; 345/716; 345/723; 345/740; 345/753
(58) Field of Search ................................. 709/204, 223, 709/229, 231; 710/8; 345/173, 733, 672, 855, 740, 723, 753, 736, 716

(56) References Cited

U.S. PATENT DOCUMENTS

| 5,261,044 A | * | 11/1993 | Dev et al. ..................... 345/855 |
| 5,283,861 A | * | 2/1994 | Dangler et al. .............. 345/740 |
| 5,353,399 A | * | 10/1994 | Kuwamoto et al. ......... 345/736 |
| 5,648,813 A | | 7/1997 | Tanigawa et al. |
| 5,673,429 A | * | 9/1997 | Minatogawa et al. ....... 707/100 |
| 5,694,544 A | * | 12/1997 | Tanigawa et al. ........... 345/753 |
| 5,778,377 A | * | 7/1998 | Marlin et al. ........... 707/103 R |
| 5,825,432 A | * | 10/1998 | Yonezawa .................... 348/563 |
| 5,857,206 A | * | 1/1999 | Tsutsumitake ............... 707/203 |
| 5,883,621 A | * | 3/1999 | Iwamura ....................... 725/37 |
| 5,887,193 A | * | 3/1999 | Takahashi et al. .............. 710/8 |
| 5,893,127 A | * | 4/1999 | Tyan et al. .................. 715/513 |
| 5,990,884 A | * | 11/1999 | Douma et al. ................ 345/716 |
| 6,075,519 A | * | 6/2000 | Okatani et al. .............. 345/173 |
| 6,081,262 A | * | 6/2000 | Gill et al. ................. 715/500.1 |
| 6,131,111 A | * | 10/2000 | Yoshino et al. .............. 709/204 |
| 6,222,534 B1 | * | 4/2001 | Ohishi et al. ................ 345/672 |
| 6,259,679 B1 | * | 7/2001 | Henderson et al. .......... 370/254 |
| 6,288,716 B1 | * | 9/2001 | Humpleman et al. ........ 345/733 |
| 2001/0035875 A1 | * | 11/2001 | Suzuki et al. ................ 345/723 |
| 2001/0049684 A1 | * | 12/2001 | Light et al. .................. 707/102 |

FOREIGN PATENT DOCUMENTS

| JP | 04114230 | * | 9/1990 |
| JP | 4-46496 | | 2/1992 |
| JP | 7-135689 | | 5/1995 |
| JP | 9-149325 | | 6/1997 |

* cited by examiner

*Primary Examiner*—Nabil El-Hady
(74) *Attorney, Agent, or Firm*—Wenderoth, Lind & Ponack, L.L.P.

(57) ABSTRACT

When a plurality of display parts, or icons, such as "play" or "stop" are displayed on a screen, information about the positional relationship in which these icons will be laid out on the screen is first assigned as an attribute of each icon. Also, using a certain icon as a reference, information about the layout of the icons, such as whether they are above, below, to the left, or to the right of this icon, is assigned as an attribute of the icon serving as the reference. In this way it is possible to vary the layout of a display according to the size of the display screen.

48 Claims, 22 Drawing Sheets

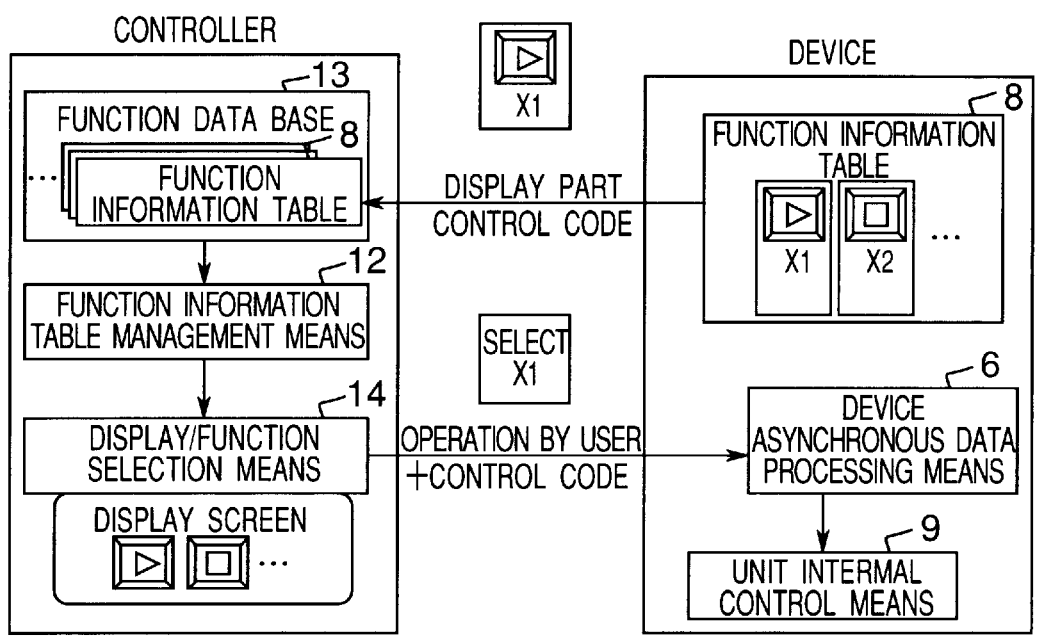

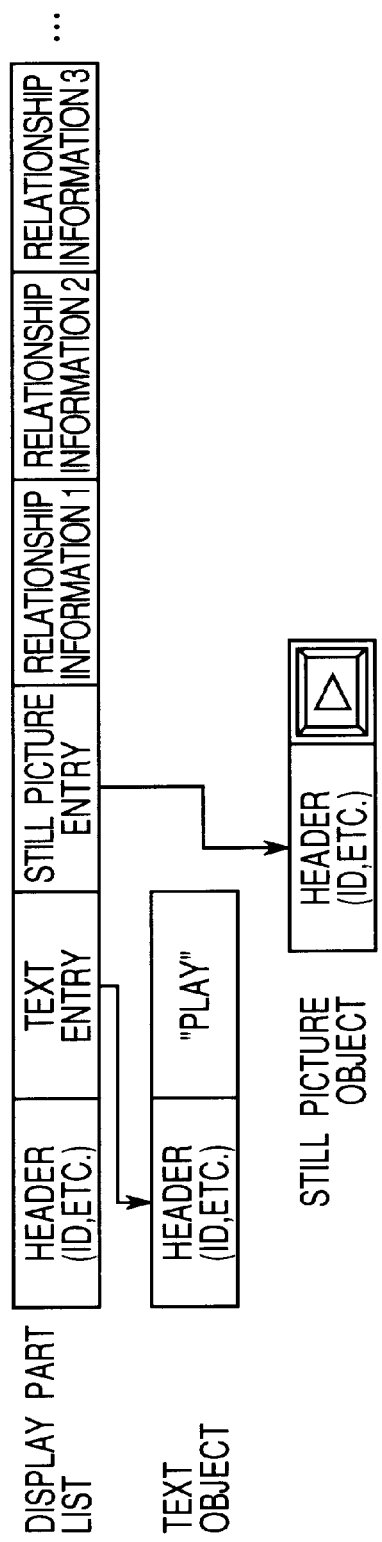

Fig.7A
INFORMATION ABOUT RELATIONSHIP WITH DISPLAY PARTS
| DISPLAY PART | | RELATIONSHIP INFORMATION |
|---|---|---|
| TEXT | STILL PICTURE | |
| PLAY | ▷ | "01" |
| RECORD | ○ | "02" |
| STOP | □ | "01", "02" |
Fig.7B
NORMAL DISPLAY SCREEN
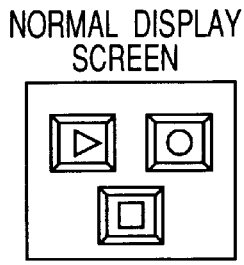
Fig.7C
SMALL DISPLAY SCREEN 1
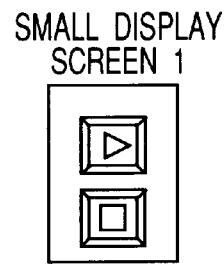
Fig.7D
SMALL DISPLAY SCREEN 2
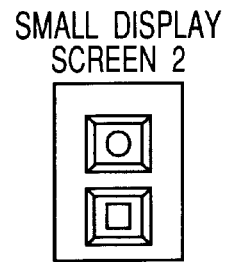

NORMAL DISPLAY

SMALL DISPLAY SCREEN 1

SMALL DISPLAY SCREEN 2

DISPLAY PARTS HAVING ONE SET OF OPERATION INFORMATION

SCREEN DISPLAY (MAIN MENU)

SCREEN DISPLAY (MENU 1)

Fig. 13A
INFORMATION ABOUT RELATIONSHIP WITH DISPLAY PARTS
| DISPLAY PART | | | OPERATION INFORMATION | | | |
|---|---|---|---|---|---|---|
| IDENTI-FIER | TEXT | STILL PICTURE | UP | DOWN | LEFT | RIGHT |
| 01 | PLAY | ▷ | "01" | "04" | "02" | "03" |
| 02 | REWIND | ◁◁ | "01" | "04" | "02" | "03" |
| 03 | FAST FORWARD | ▷▷ | "01" | "04" | "02" | "03" |
| 04 | STOP | □ | "01" | "04" | "02" | "03" |
Fig. 13B
SCREEN DISPLAY (INITIAL STATE)
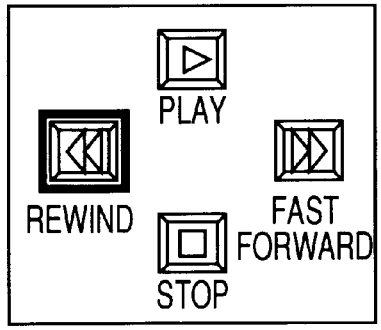
Fig. 13C
SCREEN DISPLAY (WHEN RIGHT KEY IS SELECTED)
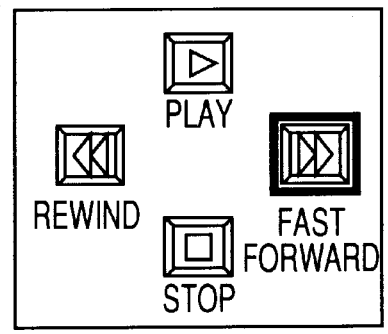

NETWORK CONTROL SYSTEM, CONTROLLER, AND DEVICE

TECHNICAL FIELD

This invention relates to a network control system in which units connected on a network are operated through the network, and more particularly to a unit control system that makes use of a graphical user interface (GUI) that supports unit operation by the user by means of graphics, characters, or the like on a screen.

BACKGROUND ART

Recent years have seen the debut of unit control systems in which graphics (icons) consisting of characters or the like, or screen display information showing the function of the units is displayed on a television screen, and a unit is controlled by using a television remote control to select from among these graphics. Another network system that has debuted makes use of IEEE 1394-1995 to connect DVC or other such digital units and transmit and receive audio/video data.

A conventional network control system is disclosed in Japanese Laid-Open Patent Application No. 9-149325.

An example of a conventional network control system will be described below.

With AV units, such as with a digital interface of IEEE 1394 standard or the like, the various AV units are connected by a serial bus periodically given equal communication opportunities through a bidirectional packet communication system with other AV units without the various AV units being switch-connected.

Here, the various AV units each store their own screen display data, this screen display data is transmitted to a controller having a graphic display function (such as a television receiver) at the request of the controller, and the controller displays this screen display data.

The controller also has a function for inquiring about the data needed for the display of the connected AV units, and a function for controlling the display screen on the basis of the screen display data from the AV units.

The AV units each have a recording medium for storing screen display data, and a function for selecting the suitable screen display data with respect to the inquiry about screen display data from the controller.

With a conventional network control system configured this way, the screen display data is first stored in each device (AV unit), and is then outputted according to the display requests from the controller (television receiver), which results in the graphics of each individual device (AV unit) being displayed on the screen of the controller.

DISCLOSURE OF THE INVENTION

Technical Problems which the Invention Is Intended to Solve

A problem with the above structure, however, was that when the screen size of a controller was smaller than the screen size that a device was supposed to have, the information of the device could not be displayed properly. Another problem was that screen display data had to be incorporated from the device during the display of an operation screen for operation by the user, which resulted in poor response.

Furthermore, the method for controlling a device was not normally disclosed, and while a controller could display the information of a device with the above structure, there was the problem that it was difficult for the controller to control the device unless the method for controlling the device was disclosed. A particular problem was that when video or audio stream data was sent out from a device, because the method for determining which region of the transmission line it was being sent to was not disclosed, it was difficult for the controller or another display device to receive the stream data sent by the device.

The present invention was conceived in light of the above problems, and an object thereof is to provide a network control system with a simple structure, which can respond quickly to operation by a user and with which an operating environment that is easy for a user to understand can be constructed, even when the screen size that a device is supposed to have is different from the screen size of the controller.

It is also an object of the present invention to provide a network control system with a simple structure, with which an operating environment that is suited to various functions or various units can be constructed, which can control various functions or various units with ease, and with which a controller and a device can share channel information for a transmission line by a simple method, and to provide a device and a controller that constitute this network system.

Method for Solution Thereof

In order to solve the above-mentioned problems, the network control system of the present invention is characterized in that the devices have a plurality of display parts that constitute an operation screen for the devices, the display parts have layout information showing the layout relationship to be assumed with the other display parts, the controller reads the display parts from the devices, and the display parts are displayed on a display screen according to this layout information.

It is also characterized in that the layout information is relationship information having the same information for a plurality of display parts to be laid out in proximity.

It is also characterized in that the layout information comprises identifiers of the display parts to be laid out in proximity.

It is further characterized in that the display parts have identifiers for the display parts to be laid out in proximity in the directions of up, down, left, and right.

It is also characterized in that one display part has a plurality of sets of layout information.

It is also characterized in that the devices have a plurality of display parts that constitute an operation screen for the devices, a set consisting of a number of display parts is shown from among the display parts, there are configuration set parts having information showing the priority order of display, the controller reads the display parts and the set information from the devices, and the display parts are displayed on a display screen according to information about the configuration set parts.

It is further characterized in that the configuration set parts have a hierarchical structure.

It is also characterized in that the devices have a menu consisting of a plurality of display parts showing an operation screen for the devices, the controller reads the display parts from the devices, and when the menu is larger than the display screen of the controller, the display of the controller is divided into a plurality of pages the same size as or smaller than the display screen, and the controller produces information about navigation between the plurality of pages and displays this information on the display screen.

It is also characterized in that the devices have display parts having manipulation information for changing the display of the operation screen through operation by the user, and a menu consisting of a plurality of the display parts showing the operation screen, the controller reads the display parts from the devices, the menu of the devices is displayed on the display screen, and the display of the display screen is changed through the operation by the user according to the manipulation information.

It is also characterized in that the manipulation information comprises identifiers showing the other display parts.

It is also characterized in that the devices have a plurality of menus, and the menus are equipped with display parts having as manipulation information identifiers that show the other menus.

It is also characterized in that the devices have help menus that explain the functions exhibited by the various display parts, and the display parts have as manipulation information identifiers that show the help menus.

In order to solve the above-mentioned problems, the network control system of the present invention is characterized in that the devices have display parts that contain channel information indicating the channel of the transmission line and that constitute an operation screen for the devices, the controller reads the display parts from the devices, and the channel of the transmission line is set according to the channel information in the handling of the data shown by the display parts.

It is also characterized in that the devices have a plurality of display parts that constitute an operation screen for the devices and configuration set parts that have channel information indicating the channel of the transmission line and that show a set consisting of a number of display parts from among the display parts, the controller reads the configuration set parts and the display parts from the devices, and the channel of the transmission line is set according to the channel information in the handling of the data shown by the display parts belonging to the configuration set parts.

It is also characterized in that the devices have a plurality of display parts that show an operation screen for the devices and menus listing channel information indicating the channel of the transmission line, the controller reads the display parts and the menus from the devices, and the channel of the transmission line is set according to the channel information in the handling of the data shown by the display parts belonging to the menus.

It is also characterized in that the display parts, configuration set parts, or menus have flags showing the type of stream.

It is also characterized in that the devices have content display parts that constitute an operation screen for the devices, show the content handled by the devices, and list control codes specifying the content, the controller reads the display parts from the devices, and the controller uses the control codes to direct the transmission and receipt of the content to the devices in the operation of the content display parts by the user on the display screen.

It is also characterized in that the content display parts have channel information indicating the channel of the transmission line over which the content shown by the content display parts are transmitted and received.

It is also characterized in that the devices have display parts that constitute an operation screen for the devices, show the content handled by the devices, and list control codes specifying the content, and content configuration set parts that show a set consisting of a plurality of the content display parts, the controller reads the display parts and the content configuration set parts from the devices, the content display parts are displayed on a display screen according to the information shown by the configuration set parts, and the controller uses the control codes to direct the transmission and receipt of the content to the devices in the operation of the display parts by the user on the display screen.

It is also characterized in that the devices have display parts that constitute an operation screen for the devices, show the content handled by the devices, and list control codes specifying the content, and content menus that show the functions of the devices and codes that indicate one or a plurality of the display parts, the controller reads the content menus and the display parts from the devices, the content menus are displayed on a display screen, and the controller uses the control codes to direct the transmission and receipt of the content to the devices in the operation of the display parts by the user on the display screen.

It is also characterized in that the devices have display parts that constitute an operation screen for the devices and content menus that show the functions of the devices and codes that indicate one or a plurality of the display parts, the controller requests the right to use the devices, and the devices transmit a menu list containing identifiers for the display parts that constitute the menus of the devices to the controller when the devices grant the usage right.

BRIEF DESCRIPTION OF THE DRAWINGS

FIG. 5 is an explanatory diagram of the network control system in the first embodiment;

FIG. 6 is a structural diagram of display parts in the second embodiment;

FIG. 7A is an explanatory diagram illustrating the display parts and relationship information in the second embodiment;

FIG. 7B is an explanatory diagram of a normal screen display in the second embodiment;

FIG. 7C is a first explanatory diagram of a small screen display in the second embodiment;

FIG. 7D is a second explanatory diagram of a small screen display in the second embodiment;

FIG. 13A is an explanatory diagram illustrating display parts and manipulation information in the fifth embodiment;

FIG. 13B is an explanatory diagram of the screen display in the initial state in the fifth embodiment;

FIG. 13C is an explanatory diagram of the screen display during right key selection in the fifth embodiment;

BEST MODE FOR CARRYING OUT THE INVENTION

The network control system in an embodiment of the present invention will now be described through reference to the figures.

First Embodiment: General layout information

The first embodiment will be described using FIGS. 1 to 5. When a plurality of display parts, or icons, such as "play" or "stop" are displayed on a screen, information about the positional relationship in which these icons will be laid out on the screen is first assigned as an attribute of each icon. In the first embodiment, an overall description of a network control system will be given using relationship information as a typical example of layout information.

Figure 1:
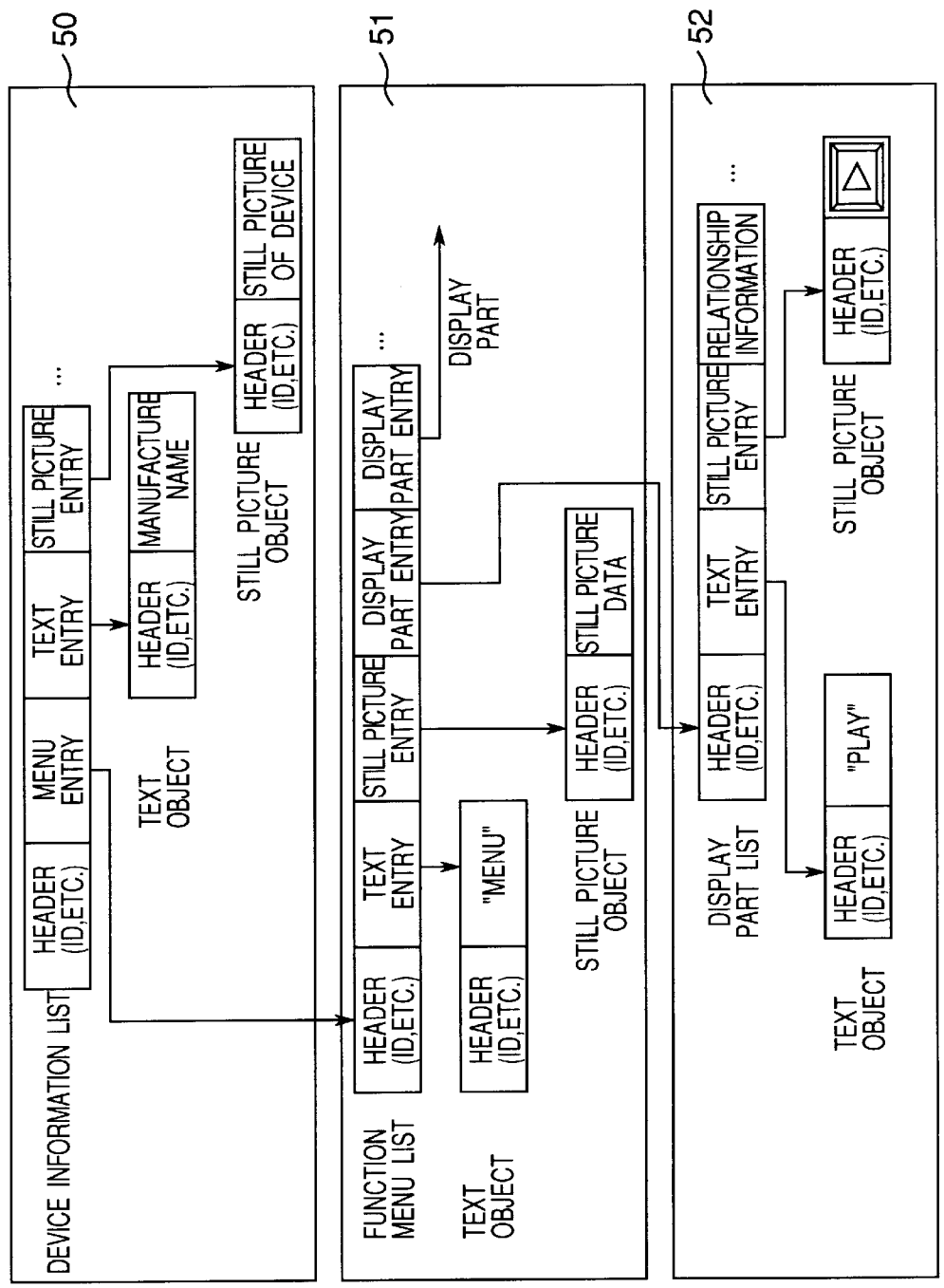
FIG. 1 is a structural diagram of a function information table in the first and sixth embodiments.
Figure 2:
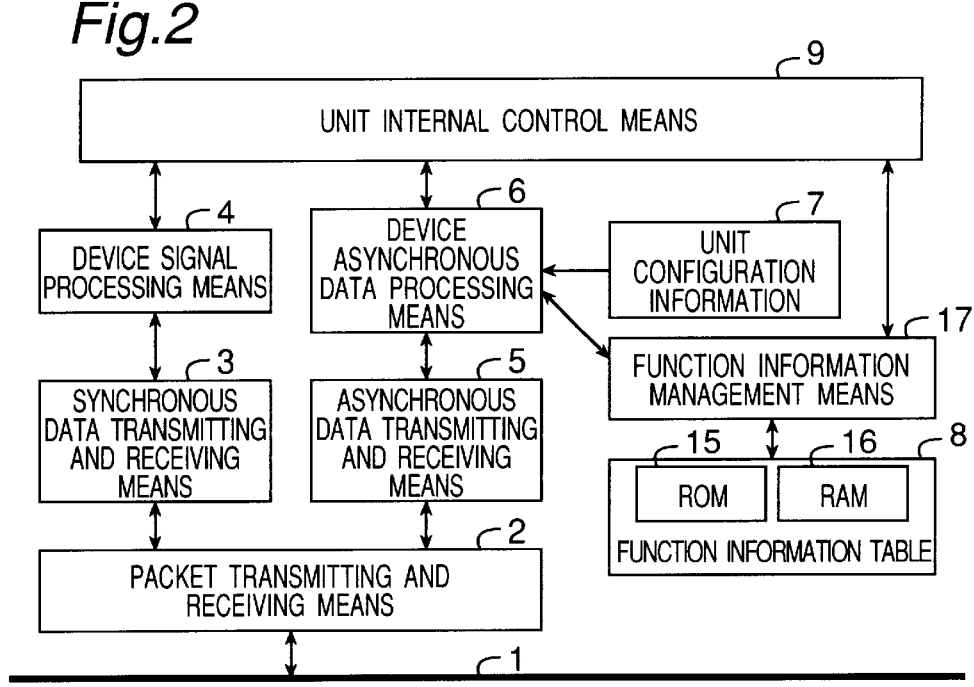
FIG. 2 is a block diagram of a device in the network control system in the first embodiment.
Figure 3:
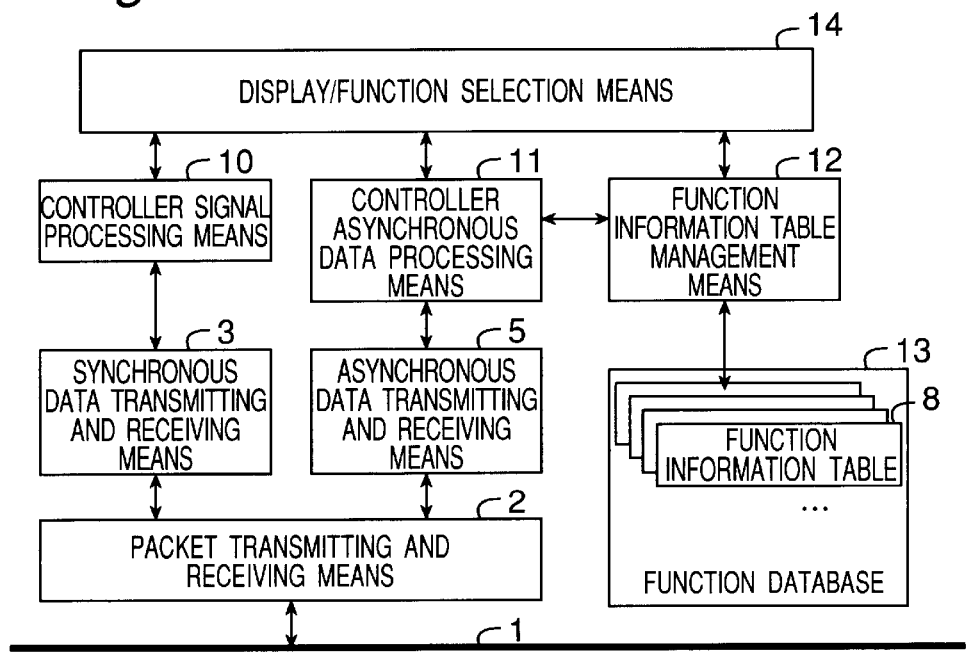
FIG. 3 is a block diagram of a controller in the network control system in the first embodiment.

FIG. 1 illustrates the structure of a function information table in this embodiment, FIG. 2 is a block diagram of a device in the network control system in this embodiment, and FIG. 3 is a block diagram of a controller in the network control system in this embodiment. The structure and operation of the network system in this embodiment will now be described using FIGS. 1, 2, and 3.

The term "device" used in this Specification refers to something that is being controlled, while "controller" refers to what is controlling these. A device and a controller may both be present in a single unit, or there may be just one or the other. A "unit" corresponds to a single node on a transmission line, and an apparatus may be constituted such that there are a plurality of nodes within a single case.

First, in FIG. 2, 1 is a transmission line, 2 is a packet transmitting and receiving means, 3 is a synchronous data transmitting and receiving means, 4 is a device signal processing means, 5 is an asynchronous data transmitting and receiving means, 6 is a device asynchronous data processing means, 7 is unit configuration information, 8 is function information tables, 9 is a unit internal control means, 15 is a rewritable memory region (ROM) in which some of the function information tables 8 are laid out, 16 is a rewritable memory region (RAM) in which some of the function information tables 8 are laid out, and 17 is a function information management means.

Here, transmission line 1 is a serial bus (1394 bus) as set forth, for example, in the IEEE 1394 standard (IEEE 1394-1995 and superseding standards compatible therewith), and is able to transmit and receive both synchronous data and asynchronous data by time sharing or another such method. Furthermore, synchronous data can be transmitted using a plurality of channels divided by time sharing or another such method, and the bands of these various channels can be set individually. The transmission line 1 does not necessarily have to be a 1394 bus, and the transmission lines used in ATMs, the Ethernet, infrared transmission, or the like may be used instead.

The packet transmitting and receiving means 2 provides a physical and electrical interface with the transmission line 1, and also mediates the bus usage right, performs cycle control for synchronous transmission, and so on. Furthermore, the packet transmitting and receiving means 2 picks out and receives packets from the transmission line 1 according to the address, and transmits packets over the transmission line 1.

The synchronous data transmitting and receiving means 3 manages the transfer rate (division of data) or adds headers during transmission. For instance, when a 1394 bus with an AV protocol (IEC 61883) standard is used, CIP (Common Isochronous Packet) headers are added by the synchronous data transmitting and receiving means 3. Conversely, when data is being received, the synchronous data transmitting and receiving means 3 sorts the received packets in the proper order, removes headers, and so on.

The device signal processing means 4 receives synchronous data from the synchronous data transmitting and receiving means 3, and performs signal processing according to the device. For instance, if this device is a recording and playback unit such as a digital VTR, then it records synchronous data to a recording medium (such as a magnetic tape). The device signal processing means 4 also fetches synchronous data from a recording medium, broadcast waves, or the like, and sends it to the synchronous data transmitting and receiving means 3.

The asynchronous data transmitting and receiving means 5 performs transaction processing of asynchronous data according to the protocol of the transmission line 1. For instance, with a 1394 bus, it processes read transactions, write transactions, lock transactions, and so forth. Here, the asynchronous data transmitting and receiving means 5 may consist of software. The device asynchronous data processing means 6 processes the asynchronous data received from the asynchronous data transmitting and receiving means 5, and transmits it to the suitable constituent elements of this device. For example, if the asynchronous data received by the device asynchronous data processing means 6 comprises control codes and operation information from the user, the validity thereof is evaluated, and if these are valid, the device asynchronous data processing means 6 outputs a directive to the unit internal control means 9 to execute a function corresponding to these control codes and operation information from the user.

Here, the control codes and operation information from the user may be transmitted to the function information management means 17, and at this point the function information management means 17 evaluates these for validity, and if it finds them valid, it directs the unit internal control means 9 to execute the functions indicated by these.

The device asynchronous data processing means 6 also reserves and sets the channels or bands used for synchronous data.

Next, when there is a request for unit configuration information 7 from the controller, the device asynchronous data processing means 6 sends the information contained in the unit configuration information 7 to the controller via the asynchronous data transmitting and receiving means 5 or the like according to the request received via the asynchronous data transmitting and receiving means 5 or the like.

Furthermore, the device asynchronous data processing means 6 sends asynchronous data from the constituent elements within the device to the asynchronous data transmitting and receiving means 5 on the basis of a directive from the unit internal control means 9.

Here, the asynchronous data transmitting and receiving means 5 and the device asynchronous data processing means 6 may consist of a single means.

The unit configuration information 7 indicates the configuration information for a unit, and is described, for instance, according to the rules given for the configuration ROM of CSR (Command and Status Registers) architecture in the ISO/IEC 13213:1994 standards. When a 1394 bus is used, there is a unit directory containing information about the bus to which this unit corresponds, that is, whether a bus manager or isochronous operation is supported, and information about whether an AV protocol is supported, and there is a unique ID which is an identifier for this unit. The unit configuration information 7 also contains the leading address of the ROM 15 in order to show where the function information tables 8 are. The function information tables 8 are tables of information for configuring the operation screen of this device.

These function information tables 8 include objects necessary for the operation of the device, identifiers (ID) for identifying these objects, and so on.

Here, each object has a hierarchical structure in list format, and in this Specification, the various display parts and the information and lists themselves will be collectively referred to as objects.

The term "display part" here refers to something that is locally displayed on a screen, such as an icon, button, slider, checkbox, text entry, or the like, and there is still picture data such as the operating button of a unit, text data indicating a unit or the like, audio data such as sound effects, and program codes including still picture data or text data. The information in the function information tables 8 is transferred to the controller via the 6, the asynchronous data transmitting and receiving means 5, or the like according to a request from the controller on the transmission line 1.

These function information tables 8 are laid out in the ROM 15 and the RAM 16. In the ROM 15 is stored information that is specific to the device and does not need to be rewritten frequently, that is, objects such as still picture data showing the operating button for a unit. Furthermore, this ROM 15 may comprise a flash ROM, in which case the function of the unit itself can be rewritten.

Also, the unit internal control means 9 or the controller on the transmission line 1 writes objects as needed via the function information management means 17 to the RAM 16 in which this function information tables 8 are laid out. The information written here is content information or status information.

In the case of an STB, for example, this content information is information about programs currently being broadcast (information such as the program title, title screen, theme music, summary, cast credits, or the like), and in the case of DVD, this is information about the content recorded on the DVD disk (information such as the program title, title picture, theme music, summary, cast credits, or the like).

In the case of a VTR, for example, this status information is an object such as a display part that shows the status of the unit (play, rewind, timer recording). Furthermore, any information necessary for network control, such as identifier information about the controller using this device, or the date, time, channel number, and other such timer recording information, may also be written here. The function information management means 17 converts the address of the ROM 15 or RAM 16 and the identifier (ID) of an object. Further, the address is not merely converted, and when, for example, a certain display part is rewritten and the data size is so large that it cannot be written to the original address region, a new address is assigned.

Thus, each object can be read or written with the ID of the object from the device asynchronous data processing means 6, the unit internal control means 9, or the controller on the transmission line 1.

If the address of each object or the like is known, then the address of the ROM 15 or the RAM 16 may be used to read or write it. Further, these may be combined to read or write a display part or the like, or reading and writing may be accomplished by a relative address within the display part indicated by the ID.

Also, when the function information management means 17 performs the management of an object ID, such as when a new object is added, this object is given an ID that is not shared by anything else, and conversely, when an object is deleted, the ID of this object is rendered invalid.

Also, the function information management means 17 can be configured such that when a display part is changed, the changed display part information (the ID of the object, or the ID and the object itself) is sent to the controller, in which case there is no need for the controller to constantly monitor an object that might change, reducing the processing of the controller, and allowing the system to easily accommodate an object that shows content information or status information which changes often.

The unit internal control means 9 serves to control the various constituent elements including the mechanisms and so forth within this device, and if the data received by the device asynchronous data processing means 6 is a control code indicating the operation of the function of the device, then the operation is carried out according to this control code at the directive of the device asynchronous data processing means 6.

The operation of a device with respect to a request from the controller or the like is as follows. First, when the device is connected to the transmission line 1, or when the controller is connected to the transmission line 1, the controller first reads the unit configuration information 7 of the device, confirms the location of the function information table 8, and reads the content of the function information table 8.

The structure may be such that the unit configuration information 7 does not contain the address information of the function information table 8, and only the existence of the function information table 8 is indicated, in which case the controller issues a command to the device requesting the function information table 8, and acquires the information in the function information table 8. In this case, the structure may be such that a command is issued requesting only a part of the function information table 8, such as a display part, and only the display part and its ID are acquired.

When a control code and user operation information are received from the controller, the processing indicated by this control code and the user operation information is carried out according to the status.

Here, for an object that is a display part showing the function of a device, when the control code of this object is sent from the controller along with the operation "select" of the user, the asynchronous data transmitting and receiving means 5 outputs a directive to the unit internal control means 9 so that the function shown by this object will be executed.

Thus, a device need only present the function information table 8 with respect to a request from the controller for GUI (Graphical User Interface) information, so the load on the device can be reduced. For the various functions of a device, there is no need to specify a command with a standardized group or the like, and even with a device having new functions that cannot be foreseen today, it is possible to use these new functions easily through the transmission line 1.

The constituent elements of the synchronous data transmitting and receiving means 3, the device signal processing means 4, and so on here may be configured as desired, or eliminated, according to the function of the device. Also, the various means may be configured either as hardware or software.

The function of the device was specified here by the user operation information or the control code of the object, but it is also possible for the structure to be such that "select" is the only operation by the user that is recognized, in which case the function of the device can be specified with just the control code of the device, so the function of that device can be executed with just this control code, and the size of the packet that is transmitted can be smaller.

Also, a control code was used here as the ID of the object, but this control code may be set for the device as desired, and for example may comprise a number assigned according to the type of function of the device, and a serial number for each type, or a unique control code used internally in the device may be used, in which case the various functions will be easier to mount in the device.

FIG. 3 is a block diagram of a controller in the network control system in this embodiment. Here, 10 is a controller signal processing means, 11 is a controller asynchronous data processing means, 12 is a function information table management means, 13 is a function data base 13, and 14 is a display/function selection means. In FIG. 3, those constituent elements that are the same as in FIG. 2 are numbered the same, and will not be described again.

The controller signal processing means 10 receives synchronous data from the synchronous data transmitting and receiving means 3, and performs signal processing according to this controller. For instance, if this controller is a video display unit such as a video monitor, the synchronous data (such as an MPEG2 stream) is decoded and displayed on the screen.

The controller asynchronous data processing means 11 processes the asynchronous data received from the asynchronous data transmitting and receiving means 5, and transmits it to the suitable constituent elements of this controller. The controller asynchronous data processing means 11 also reserves and sets the channels or bands used for synchronous data.

The controller asynchronous data processing means 11 also receives the contents of the function information table 8 for the devices, information about the devices on the transmission line 1, such as the connection of a new device or the removal of an existing device, and so on from the packet transmitting and receiving means 2 via the asynchronous data transmitting and receiving means 5, and transmits it to the function information table management means 12.

Further, the controller asynchronous data processing means 11 sends the asynchronous data from the constituent elements in the controller to the asynchronous data transmitting and receiving means 5 on the basis of a directive from the display/function selection means 14. Here, the asynchronous data transmitting and receiving means 5 and the controller asynchronous data processing means 11 may comprise a single means.

When the controller and the device are located within the same unit, either the controller knows the function of the device in that unit, or the internal control of the unit is carried out directly by the unit internal control means 9, so there is a function information table 8 for the device, but it is not registered in the function data base 13 inside this unit. The function information table 8 inside this controller should have the information of the function information table 8 of the device, but these sets of information do not necessarily have to be the same.

In this case, the location of the function information table 8 within the device may be noted in the unit configuration information 7, and registered ahead of time in the function data base 13.

When the controller and the device are located within the same unit, the controller signal processing means 10 and the device signal processing means 4, and the controller asynchronous data processing means 11 and the device asynchronous data processing means 6 may comprise a single unit.

The function information table management means 12 manages the function information table 8 received from a device on the transmission line 1, and when information is received from the controller asynchronous data processing means 11 to the effect that a new device has been connected, a directive is outputted to the controller asynchronous data processing means 11 to read the function information table 8 of this new device.

Then, when the function information table 8 of a new device has been read, this function information table 8 is registered in the function data base 13. Also, when information is received to the effect that an existing device on the transmission line 1 has been removed, for example, the corresponding function information table 8 is deleted from the function data base 13.

The structure here may be such that when an existing device is removed, the function information table 8 is not deleted but is instead stored in a memory means within the controller, or the structure may be such that when this device is connected again, this device is recognized by a device identifier or the like, and the function information table 8 is read from the memory means within the controller and registered in the function data base 13, both of which allow quick registration of the connected unit.

The function data base 13 is disposed in a rewritable memory space, and the function information table 8 received from a device is configured as a data base. By using the function information table management means 12 to search this data base, it is possible to fetch objects such as information about various devices or about various units, ID corresponding to these objects, display parts for notifying the user of these objects, display parts that are to be displayed when the user operates these display parts, control codes to be transmitted, and so on.

The function data base 13 does not necessarily have to contain all of the information of the function information table 8 all the time, and may contain only the required portion.

The display/function selection means 14 notifies the user of display parts(video, audio, character information, etc.) showing GUI information about a function or GUI information about a device on the controller screen, and also selects devices and functions according to operation by the user, directs the execution of various functions, and so forth.

It is also possible to display/play data received from the controller signal processing means 10 (such as video or audio data) or data received from the controller asynchronous data processing means 11.

In this case, the GUI information and the like may be displayed in overlay with the video data received from the controller signal processing means 10, or the FUI information display screen and the video data display screen may be alternately displayed through switching by directive from the user or the like.

Furthermore, a directive is sent to the function information table management means 12 to search the function information table 8 within the controller, and display on the screen the display parts showing the devices on the transmission line 1 or the functions of these devices (device titles, function titles, display-use still pictures, etc.).

When the user selects a display part showing a device, the menu of this device is read from the function information table 8 and displayed on the screen.

When the user selects a display part showing a function, the control code corresponding to this display part obtained from the function information table 8 and the operation information obtained from the user are issued through the controller asynchronous data processing means 11 and so on. The display/function selection means 14 receives the response of the device with respect to this control code and the user operation information via the controller asynchronous data processing means 11, and if there is a directive in this response to change a display part from the device (such as notification of the ID of a display part to be changed), then the display part to be changed is retrieved from the device according to this directive, and the suitable display part with respect to the status of the device at the present time, for example, is displayed on the display screen to notify the user.

The controller does not necessarily have to under every function of a device. For instance, even with a device having a new function that cannot be foreseen at present, the controller will be able to fetch the display part for this new function from the function information table 8 and display it on the screen to notify the user.

If the user understands a new function through this display part and selects this function, the display/function selection means 14 of the controller will refer to the function information table 8, obtain a control code corresponding to this new function, and issue this control code and the operation of the user to the device, allowing this new function to be executed by the device. Thus, adopting the above structure makes it possible for a user to execute even new functions that cannot be foreseen at the present time.

The constituent elements here, such as the synchronous data transmitting and receiving means 3 and the controller signal processing means 10, may be configured as desired, or eliminated, according to the functions of the controller.

Figure 4:
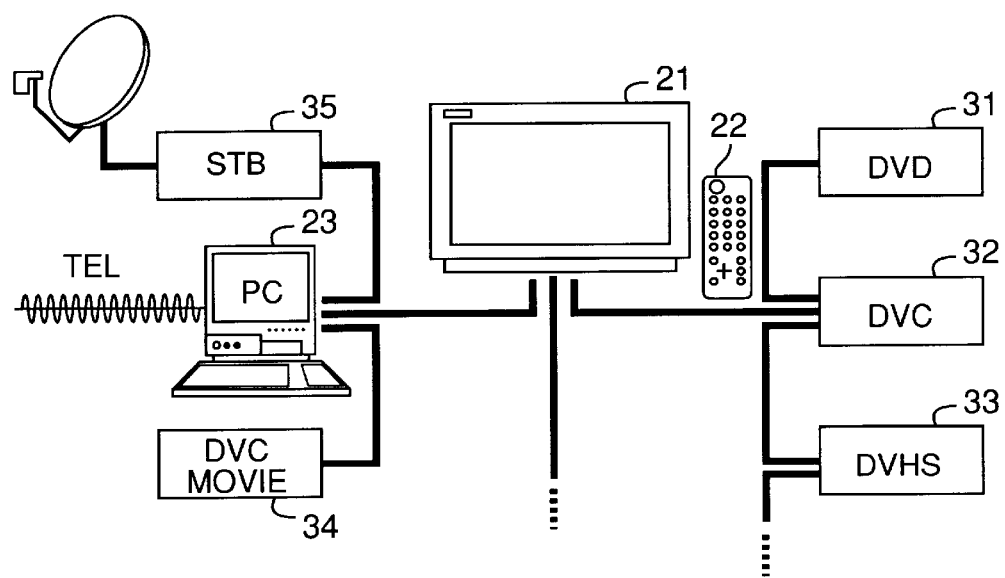
FIG. 4 is a system configuration diagram illustrating an example of the network control system in the first embodiment.

FIG. 4 illustrates the system configuration in the network control system in this embodiment.

In FIG. 4, 21 is a television, 22 is a remote control for the television, 23 is a personal computer (PC), 31 is a recordable DVD, 32 is DV-format digital VTR (DVHS), 33 is a VHS-format digital VTR (DVHS), 34 is a DV-format digital movie (DVC movie), and 35 is a set top box (STB) for CS digital broadcasts or the like. These are collectively referred to as video/audio/information units.

These video/audio/information units are connected by the transmission line 1 to form an AVC system. Video/audio/ information units are not limited to the units listed above, and include current units in the fields of video, audio, and information (such as printers and mini-disks), as well as all units that will come out in the future.

The television 21 here is a unit consisting of a controller and a device (a ground wave tuner and a video monitor), and the user uses the remote control 22 to give directives to the display/function selection means 14. The PC 23 is a unit consisting of a controller and devices (a modem that provides an interface with a telephone line, a video monitor, or the like), and the user uses a keyboard, a mouse, or the like to give directives to the display/function selection means 14.

The television 21 and the PC 23 here are defined as units having integrated devices and controllers, and of the functions of a device within a unit, those functions that can be used from another unit are noted in the function information table 8 but are not themselves registered in the function data base 13 of the controller component within the unit. The television 21 and the PC 23 may also be defined as units consisting of devices and a controller, with each device in a unit having a function information table 8, and with each function information table 8 within a unit being registered in the function data base 13 of the controller within the unit.

The DVD 31 and DVC movie 34 are devices capable of recording and playing back AV data. The DVC 32 and the DVHS 33 are units consisting of devices capable of recording and playing back AV data and devices having a digital broadcast tuner function. The STB 35 is a device having a tuner function for receiving CS digital broadcasts.

The DVD 31, DVC 32, DVHS 33, DVC movie 34, and STB 35 here are termed devices, but if they are at least capable of operations in which the user selects the functions of other devices with a touch panel or remote control, or producing an environment in which other devices can be operated with a liquid crystal panel or the like, then they may be termed a unit including a controller and a device.

Another possible structure is one in which these units have a unit-use remote control and include processing functions as a controller, only audio and graphic displays are displayed on a monitor by analog connection, and the user operates the remote control of the unit while looking at this screen. In this case, this unit may include a controller and a device. FIG. 1 is an explanatory diagram of the function information table in this embodiment.

In FIG. 1, 50 denotes the device information parts, 51 denotes the function menu, and 52 denotes the display parts.

Each part here consists of an object in list format, and data objects with no sub-objects (such as text objects or still picture objects) and lists are collectively referred to as objects.

Each object has in its header portion an identifier (ID) that identifies that particular object, type information indicating the type of object, attribute information indicating the configuration (such as whether there are any sub-objects), size information indicating the size of the object, and so forth. Each object also indicates a sub-object by means of ID information within an entry made in a list.

Objects with a small amount of data, such as a text object, may themselves be entered in the entry portion within a list. The unique information of each list is entered in the header within each list, for example, and the unique information of a data object is noted in an entry. Unique information may be given in an object or in an entry.

The device information parts 50 are parts showing information about devices, and the types of commands and protocols supported by the devices, the device types in which the types of these devices are encoded, version information about these devices, and so on are noted as unique information in the device information lists in these device information parts 50. The device type may also indicate a code or character string given as the subunit_type of the AV/C Digital Interface Command Set (AV/C-CTS) discussed by the 1394 TA (1394 Trade Association), for example.

It is also possible for the device information parts 50 to contain information about the function information table 8 itself, and the support level or size of this function information table 8, the maximum transfer quantity sent asynchronously at one time by this unit, or the like may be noted as unique information.

This information may be entered in the device information lists here, or a route list may be produced as a new list for these device information lists, and the information entered therein.

In this case, before the controller reads all of the function information table 8, the controller can decide whether a level can be supported, how much memory space has to be reserved, how much the one-time transfer quantity should be, and so forth merely by looking at these parts, which makes it possible to eliminate wasted transfer.

The device information parts 50 may also be configured such that they can be directly read and written from the controller via the transmission line 1 as part of the unit configuration information. Even with a device not having a menu that shows the functions, it is possible to contain the information of the device itself, allowing uniformity to be preserved between units.

The device information parts 50 also have user interface information about the devices, and the display parts 52, such as device names that express the names of these devices in character strings, or model names in which the manufacturer has indicated the model number of a product, are laid out here, with each of these being a text object.

There are also display parts 52 here such as still picture objects showing devices, such as icons of devices, as still picture objects. These text objects, still picture objects, and so forth have entries in the device information list. There may be audio objects here, and data such as music showing these devices may also be laid out.

Simulated moving pictures consisting of a plurality of still pictures can also be used in place of still picture objects even with the function menu 51, the display parts 52, and so on. Each object here was said to have an entry in the device information list, but objects with the same purpose may instead define a list and have entries in this list. Furthermore, there may be various lists according to the GUI classification (display, selection, in operation, in use, error, and so on), in which case a display that is easier for the user to understand can be provided.

Next, the function menu 51 shows a menu that is a set of display parts 52 showing the functions of a device, and comprises a function menu list. The function menu list is linked from an entry in the device information list, and has entries of the display parts 52 for showing this list itself. Thus, the function menu can be accessed from the device information parts 50.

In this embodiment, however, the function menu is read by asking a device about the usage right (discussed later).

The function menu 51 may also be made directly accessible, without going from the entry in the device information list, by predetermining the ID of the function menu list or another such method. Here, the display parts 52 showing the functions are laid out using a display part list, and flags showing the purpose or operation of these display parts 52 (for display, for identification, for control, etc.), or flags indicating whether there is the possibility that these functions will dynamically disappear, may be added to the entries for the various display parts 52.

Data objects are laid out in the display part list shown by these display part entries.

Here, the entries of the display parts 52 may be laid out directly in the function menu list, without the display part list being used, in which case it is possible for the flags indicating purpose and so on to be given in the entries of the device information parts 50.

The function menu list also has information for configuring the operation screen of a unit, and the function information table 8 has information about the size the screen is supposed to be, as well as the background color or pattern, and other such information as unique information in its header or elsewhere.

Meanwhile, the data objects (such as text or still pictures) that show this function menu list itself have direct entries in the function menu list.

Furthermore, a display part list may be used for the data objects that show this list itself. The information showing these lists themselves may be distinguished from the display parts 52 or other data objects by using flags or the like.

The display parts 52 are parts used for displaying icons, buttons, sliders, check boxes, text entries, and so forth, and this display part list has unique information such as the type of display parts 52 and information required for each of the display parts 52 (such as the variable range, step value, and initial value in the case of a slider, for instance).

There are entries such as text objects or still picture objects in this display part list, and these entries have unique information about the various data objects such as the size of still pictures or flags indicating the type (format) of a still picture or text, as well as information about the position on the screen, which is shown as a relative position with respect to the menu the device is supposed to have.

Layout Information

Each display part list contains layout information showing the correlation between display parts as relationship information having the same information (such as the same value) with respect to the display parts 52 that are closely related in terms of function or screen design. In other words, if the screen size that the function information table 8 is supposed to have is larger than the screen size of the controller, then the controller cannot display the display screen shown in this function information table 8 as it is, so the controller rearranges the layout of the display parts 52 in the function information table 8 and divides it into a plurality of pages for display.

In this case, the plurality of closely related display parts 52 contain relationship information having the same information (value), and belong to a single display group to be displayed in proximity. As a result of this relationship information, the display parts 52 belonging to the same display group are laid out in proximity within a single page.

The "closely related display parts 52" here are, for example, used in pairs for VTR play and stop buttons or for the up and down channel buttons on a TV, or have a function similar to the cross-shaped buttons indicating channels on a TV or aspect switching keys for a TV (4-to-3, 16-to-9, letterbox, full-screen display, etc.), or are laid out in proximity in terms of screen design to be more easily understood by the user.

The device manufacturer decides independently which display parts 52 will be laid out in proximity with this relationship information. This relationship information may also be described in the header as unique information.

There is no need for this relationship information to be contained in all of the display parts 52, and is only added to those display parts 52 belonging to one of the display groups to be laid out in proximity.

Even in the case of a new function that cannot be foreseen at present, the data of this new function can be transmitted to the controller and information related to this new function presented to the user by laying out a still picture or the like showing this new function as a display part 52.

FIG. 5 is an explanatory diagram of the network control system in this embodiment, and will be used to describe the control operations of a controller and device.

In FIG. 5, when a device is connected to the transmission line 1, the controller on this transmission line 1 recognizes a new device by bus resetting, in the case of a 1394 bus, for instance, and reads the function information tables 8 through the transmission line 1 from the new device as directed by the function information table management means 12, so that these function information tables 8 are read and registered in the function data base 13 of the controller.

Here, the various function information tables 8 are distinguished, for example, by an ID unique to each device, and take on a list structure containing entries for the various devices. The function information tables 8 may be read all at once here, or only some of the function information tables 8 may be read.

Furthermore, the reading may be in object and list units.

If there is not enough memory region in the controller here, when a new device is connected, for example, the device information parts 50 should be read first. In other words, the various parts in the function information tables 8 do not necessarily need to physically contain the links shown in FIG. 5 (association of entries and entities), as long as they can be accessed from the controller in object units.

For instance, ID for a device information list or function menu list may be predetermined, and the controller may gain access directly by using this ID, or the controller may communicate with the devices so as to acquire this ID and gain access.

The various display parts 52 are distinguished within the controller by using an ID that combines the ID unique to a device with the ID of a display part 52 attached by a device.

The structure may also be such that the controller newly reattaches the ID of each display part 52, and the controller contains a conversion table of these new ID's and (the unique ID's of the devices+the ID's attached by the devices). The display parts 52 containing ID's are included in this function information table 8.

The display/function selection means 14 refers to the function information table 8 (or part of the function information table 8) in the function data base 13 through the function information table management means 12.

When the display/function selection means 14 displays a list of devices connected to this controller, then the display/function selection means 14 uses the function information table management means 12 to read the data objects (such as text objects or still picture objects) in the device information parts 50 from the function information tables 8 of all of the devices registered in the function data base 13.

The data objects of all of the device information parts 50 do not need to be displayed on the screen, and these may be suitably selected and displayed.

When there are audio objects among the device information parts 50, they are not used in the display of a list of devices, and when, for example, a new device is connected in a state in which a device list is already displayed, then a still picture object of this new device is displayed and, if there is an audio object, it is played.

Next, when the user selects a still picture object of a device by means of the pointing function (such as the directional key) of a remote control, the display/function selection means 14 uses the function information table management means 12 to read the display parts 52 from the function information list of the various functions included in the function menu list, and displays the display parts 52 corresponding to the various functions on the screen. As a result it is possible to display the display parts 52 showing all of the functions of this device.

Here again, the identification of the various display parts 52 is performed with the ID's unique to the devices and the ID's of the various display parts 52.

Since a display part 52 is contained for every function here, even when an adequate place for the display of the display parts 52 of all functions cannot be reserved due to limitations such as the resolution of the screen or the effect of other display categories (the display of a plurality of devices), the relationship information can be used to divide the display into a plurality of pages, affording the flexibility to accommodate such situations.

When the display screen is small, it is also possible to use the text data had by the display parts 52, and display only this text data. In other words, since each device has a display part 52 for each function, the controller can have the final decision right for screen display, making possible a more flexible display.

Next, when the user selects a display part 52 showing the play function of a device, for example, by means of the pointing function of a remote control, for example, the display/function selection means 14 sends the ID of this display part 52 attached by the device as a control code to the device along with the operation information of the user (such as "select"). In other words, the ID (control code) of this display part 52 and the operation information ("select") of the user are also sent to the device when the cursor is moved onto this display part 52 with the directional key (indicating left, right, down, and up) on the remote control, and the select button is pressed and then released.

It is also possible to send more detailed user operation information to a device, and when an operation such as "press," "release," or "press twice" is performed on a display part 52 through operation of a remote control of pointing device, it is also possible to send this operation information to the device.

The user operation information here may be encoded and sent along with the ID's of the display parts 52, or it may be sent as individual commands (the operands are control codes such as the ID's of the display parts 52).

In this embodiment, with the configuration described above, the ID's of the display parts 52 were used as control codes, so there is no need to specify special control codes such as commands corresponding to functions with a standardized group or the like, and all of the functions had by a device can be controlled with a simple configuration.

When the user selects a display part 52 indicating the play function of a device, for example, the display/function selection means 14 displays the playback picture from the device on the screen when the proper response from the device is returned. In this case, if the device wants to change the display part, the device transmits the ID of the display part 52 to be changed to the controller. Thus, the controller learns that the display part 52 of this ID was changed, and retrieves the display part 52 of this ID from the device and overwrites the corresponding display part 52.

Therefore, when the playback of a VTR has been executed, for example, it is possible to perform a display showing the playback of the VTR to the user by rewriting the display part 52 showing the state of this VTR at the directive of the device.

When the device wants to change a display part here, the data of this display part 52 (including text data or still picture data) may be sent to the controller along with the ID of the display part 52. Also, the ID, or the ID and data, may be sent to the controller in data object units rather than display part units.

If, for some reason, the device is unable to receive a control code sent by the controller, the display/function selection means 14 detects that the device did not receive the control code based on its response to the transmitted control code or the like, and a display part 52 independently had by the controller is displayed (displayed in a large size in a conspicuous location such as the center of the screen, for example), thereby notifying the user that control failed.

Relationship information was used as the layout information in this embodiment, but as layout information the display parts may mutually have identifiers of other display parts to be laid out in proximity, and if there are numerous display parts to be laid out in proximity, the number of identifiers had by the display part will increase, but the same effect will be obtained.

Furthermore, for a single display group consisting of a plurality of display parts to be laid out in proximity, when each display part has as layout information only one identifier of other display parts to be laid out in proximity, and a plurality of display parts are laid out in proximity, the display group to be laid out in proximity may be indicated by sequentially following the identifiers given in the layout information, and while the processing of the controller will increase, the same effect will be obtained. In this case, the last display part out of the display group has as layout information an identifier indicating that it is the last of the display group, instead of an identifier of another display part.

With this embodiment as described above, a device has a plurality of display parts that constitute the operation screen of the device, these display parts contain layout information indicating the layout relationship to be assumed with other display parts (layout information indicating layout in proximity), the controller reads the display parts from the device, and the display parts are displayed on the display screen according to the above-mentioned layout information, which means that even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

Also, the layout information is relationship information having the same information for a plurality of display parts to be laid out in proximity, there is one set of layout information for one display group consisting of a plurality of display parts to be laid out in proximity, and the display parts each have this layout information, which makes it easy to define the layout information, makes it possible to describe the layout information for display parts with appended information of a small data quantity, and makes it possible to describe layout information simply with appended information of a small data quantity even when many display parts are to be laid out in proximity.

Second Embodiment: Relationship information

The second embodiment will be described using FIGS. 6 and 7. When a plurality of icons (display parts), such as icons representing "play" or "stop," are displayed on a screen, information about the positional relationship in which they will be laid out on the screen is stored ahead of time as an attribute of the icons. In the second embodiment, relationship information will be described as a specific example of layout information.

The second embodiment of the present invention will now be described through reference to the figures.

FIG. 6 is a structural diagram of display parts in the second embodiment. Here, everything but the display parts are the same as in the first embodiment, and so will not be described here.

In FIG. 6, the display parts 52 in this function information table 8 have a plurality of sets of relationship information indicating the layout information about the display parts on the screen. Here, the first set of relationship information shall be termed relationship information 1, the second set of relationship information relationship information 2, and the third set of relationship information relationship information 3. The sets of relationship information each have different values.

Here, when there is only one set of relationship information, the value thereof is entered in relationship information 1, and nothing is entered in relationship information 2 or 3. In this case, relationship information 2 and 3 may be omitted, or a null value may be entered. Furthermore, flags or the like may be attached to indicate relationship information and distinguish it from other entries or the like.

Similarly, when there are two sets of relationship information, the values are entered separately in relationship information 1 and relationship information 2, and nothing is entered in relationship information 3. In other words, the only significance of relationship information lies in the value, and there is no significance in the entry position, whether the entry is in relationship information 1 or in relationship information 2.

It is also easy to assign priority to the value of the relationship information. For instance, a smaller value of the relationship information can be specified as having a higher priority, and when a controller of a screen smaller than the screen size the device is supposed to have displays these display parts 52, it is possible for display parts 52 having relationship information with a low value to be displayed on the first page of the display screen.

FIG. 7 is an explanatory diagram illustrating the correlation between display parts and relationship information in this embodiment.

FIG. 7A shows three display parts 52 of a VTR: "play," "stop," and "record." The value of the relationship information is "01" for the display part 52 "play," "02" for "record," and "01" and "02" for "stop."

In other words, "play" and "stop" are to be laid out in proximity, and belong to display group 01. "Stop" and "record" are also to be laid out in proximity, and belong to display group 02.

FIG. 7B is an example of when the screen size of the controller is the same as or larger than the screen size the device is supposed to have in the function menu 51 of the function information table 8. In this case, the controller displays the display parts 52 on the screen as directed by the display parts 52 and the function menu 51 in the function information table 8.

FIGS. 7C and 7D are examples of when the screen size of the controller is smaller than the screen size that the device is supposed to have in the function menu 51 of the function information table 8.

Here, let us assume that the controller is able to display only two buttons (still pictures) within one screen. The controller detects from the screen size information in the function menu 51 or the like that the function menu 51 cannot be displayed as directed by the device, and divides the display parts 52 into a plurality of display pages.

In this case, relationship information is used in deciding which of the display parts 52 will be assigned to which page. In other words, since "play" and "stop" belong to display group 01, they should be laid out in proximity, and the value of the relationship information is smaller compared to the other values.

As a result, the priority is deemed to be highest for "play" and "stop," and they are displayed on the first page, while "stop" and "record" belong to display group 02 and should be laid out in proximity, so "stop" and "record" are displayed on the next page. The switching of the pages here is performed with a screen scroll key on the remote control, for example.

Thus, with this embodiment, the layout information is relationship information having the same information for a plurality of display parts to be laid out in proximity, and as a result, even when a plurality of display groups are present in a single menu, or when there are numerous display parts belonging to a display group to be laid out in proximity, and even when a plurality of display parts make up a plurality of groups, the layout information can be described simply with appended information of small data quantity, and even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

Also, if a single display part has a plurality of sets of layout information, then even when there are a plurality of display parts to be laid out in proximity with respect to a single display part, that is, even when a single display part belongs to a plurality of display groups, and even when only a display screen that is smaller than the screen size the device is supposed to have can be used with the controller, and the menu of the device cannot be displayed completely due to limitations such as the resolution of the screen or the effect of other display categories, closely related display parts can still be displayed in proximity and always within a single screen and an operation screen that is easy for the user to understand and operate can still be provided by displaying a single display part a plurality of times in the division and display of the display parts on a plurality of pages according to the layout information.

Third Embodiment: Identifiers

The third embodiment will be described using FIG. 8. Using a certain icon as a reference, information about which icons will be laid out above this icon, below it, to the left of it, and so on is contained in the attributes of the icon serving as a reference.

The third embodiment of the present invention will now be described through reference to the figures.

Figure 8:
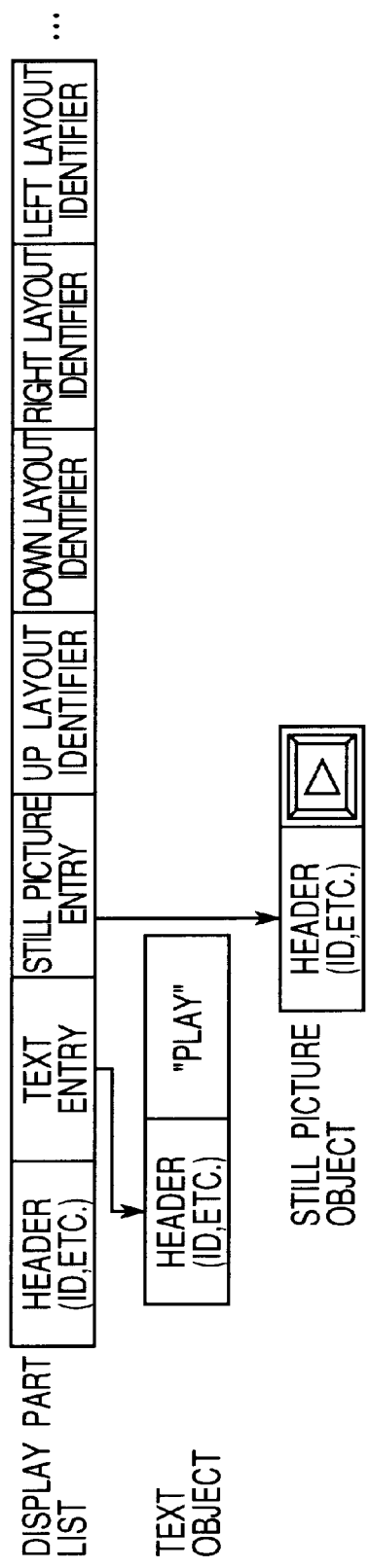
FIG. 8 is a structural diagram of display parts in the third embodiment.

FIG. 8 is a structural diagram of display parts in this embodiment. Here, everything but the display parts are the same as in the first embodiment, and so will not be described here.

In FIG. 8, the display parts 52 in this function information table 8 have identifiers (such as ID) of other display parts 52 to be laid out in the four directions (up, down, left, and right).

Here, the identifiers of the display parts 52 to be laid out in proximity in the upward direction are entered as upward layout identifiers, and similarly, the identifiers of the display parts 52 to be laid out in proximity in the downward, right, and left directions are entered as downward layout identifiers, right layout identifiers, and left layout identifiers, respectively.

When there is only layout information here in the right direction, for example, the identifiers of the display parts 52 to be displayed as right layout identifiers are entered, but the upward layout identifiers, downward layout identifiers, and left layout identifiers are not entered. In this case, the upward layout identifiers, downward layout identifiers, and left layout identifiers may be omitted, or a null value may be entered.

Furthermore, flags or the like may be attached to indicate relationship information and distinguish it from other entries or the like.

Thus, if only a display screen that is smaller than the screen size the device is supposed to have can be used with the controller, the identifiers of the display parts to be laid out in proximity can be used as layout information, and the display part can be rearranged according to this layout information, or the display can be divided into a plurality of pages, which makes it easy define the layout information, makes it possible for the controller to directly detect the display parts to be laid out in proximity, and makes it possible for the display parts to be laid out in proximity to be displayed simply on the display screen.

Furthermore, if there are identifiers for the display part to be laid out in proximity in the up, down, left, and right directions, the device can specify more precisely the display method such as rearrangement or division into a plurality of pages.

It is also possible to assign a priority to the value of the relationship information. For instance, the various layout information can be distinguished with flags, entry locations of identifiers showing layout information that are closer to the header can be specified to have a higher priority, and when a controller whose screen is smaller than the screen size the device is supposed to have displays these display parts 52, the display parts 52 having layout information in which the entry locations of the identifiers showing layout information are closer to the header can be displayed preferentially, so that they are displayed on the first page of the display screen.

Thus, with this embodiment, the layout information is identifiers of display parts to be laid out in proximity, and as a result, it is easier to define the layout information, the controller can directly detect display parts to be laid out in proximity, it is possible for display parts that are to be laid out in proximity to be displayed on the display screen more simply, and even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

Furthermore, the display parts have identifiers of display parts to be laid out in proximity in the up, down, left, and right directions, and as a result, the device can specify the display method more precisely, and the intent of the person who created the device menu can be conveyed easily to the user even when the controller only has a display screen that is smaller than the screen size the device is supposed to have.

Fourth Embodiment: Configuration sets

The fourth embodiment will be described using FIGS. 9 and 10. Out of numerous icons, those with some connection, such as icons for a video control system expressing "play," "stop," or the like, are put together and managed as a single group, and other icons with some connection, such as icons of the a television control system expressing "channel-up" or "channel-down," are put together and managed as a single group.

The fourth embodiment of the present invention will now be described through reference to the figures.

Figure 9:
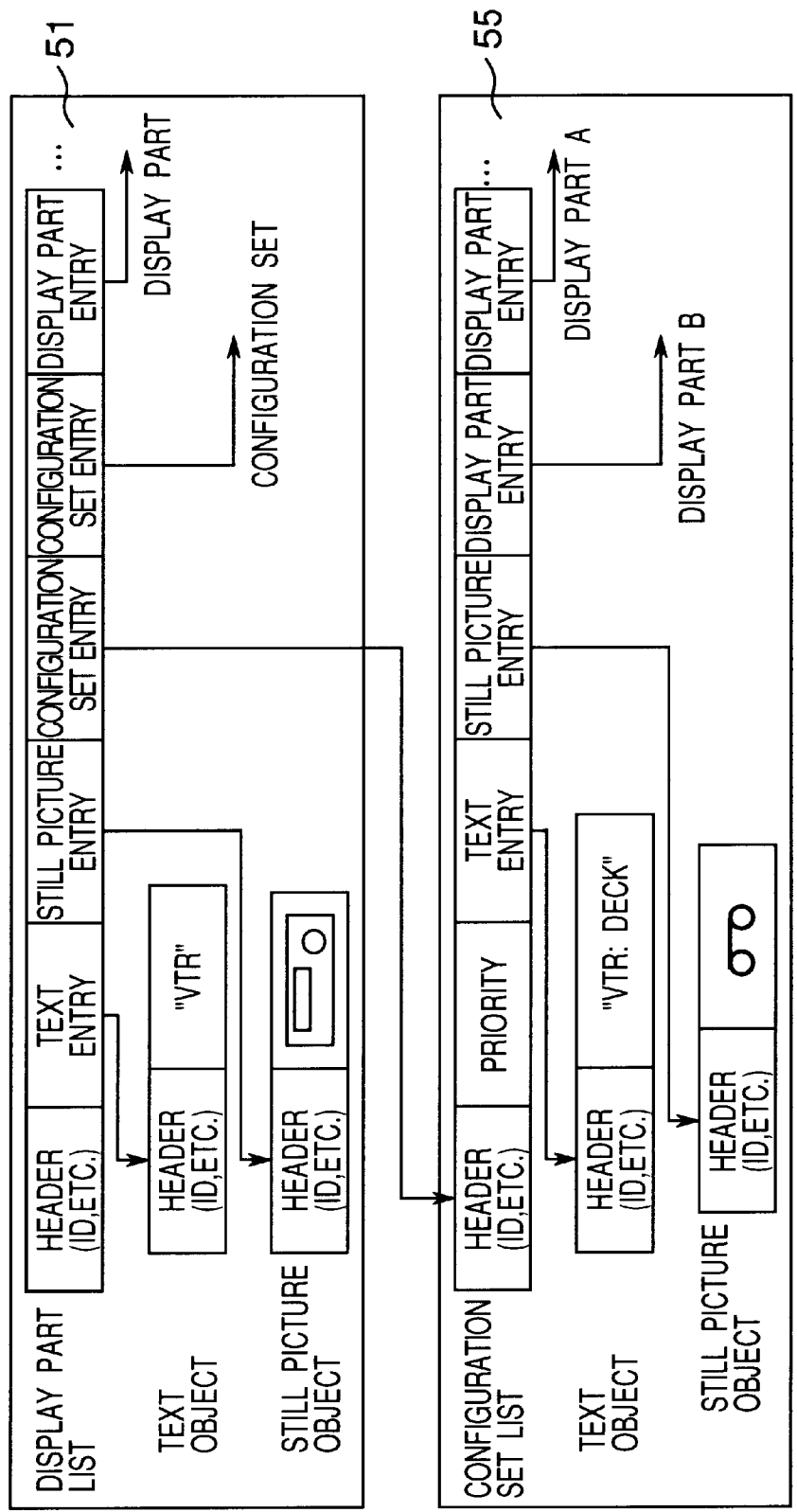
FIG. 9 is a structural diagram illustrating the function menu and configuration set parts in the fourth embodiment.
Figure 10A:
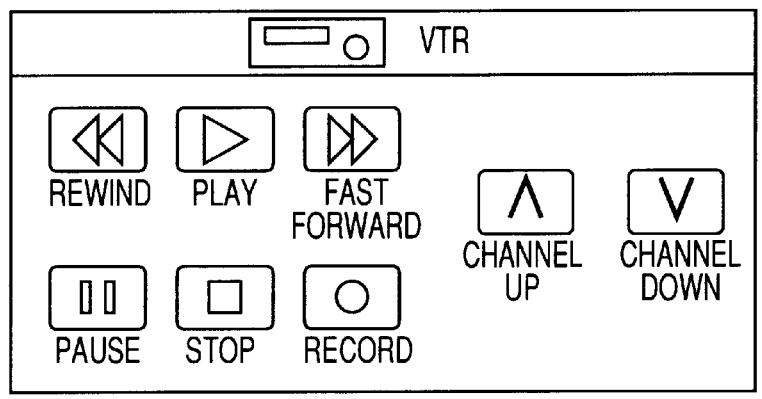
FIG. 10A is an explanatory diagram of a normal screen display in the fourth and seventh embodiments.

FIG. 9 is a structural diagram of a function menu and configuration set parts illustrating the fourth embodiment of the present invention.

The device information parts (not shown) and display parts (not shown) will not be described here because they are the same as in the first embodiment. In this embodiment, the display parts may not contain layout information.

In FIG. 9, the function menu 51 in the function information table 8 (not shown) comprises a function menu list, and has configuration set entries. These configuration set entries indicate a configuration set list.

Here, the identifiers (such as ID) of the configuration set list can be determined ahead of time, or the controller can acquire the identifiers of the configuration set list by communication with the device, which will allow the controller to directly access the configuration set list.

The configuration set parts 55 indicate a set of display parts 52 in the function menu 51, and are a set of display parts 52 (display part A and display part B) that are closely related functionally and in terms of design.

These configuration set parts 55 are configured using a configuration set list, and this configuration set list contains entries for the display parts 52 (display part A, display part B, text objects, still picture objects) that are used to show this list itself and to configure part of the operation screen.

The display parts 52 used here to show part of the operation screen are laid out using the display part list (FIGS. 1 and 8), and flags indicating the purpose and operation of these display parts 52 (for display, for identification, for control, etc.), or flags indicating whether there is the possibility that these functions will dynamically disappear, may be added to the entries for the various display parts 52.

The entries of data objects are laid out in the display part list (FIGS. 1 and 8) shown by these display part entries. Here, entries of the various data objects (such as text objects or still picture objects) may be directly laid out in a configuration set list without the use of a display part list, in which case flags indicating the purpose, etc., can be provided to the entries of the display parts 52.

Meanwhile, the data objects showing this configuration set list itself (such as text objects or still picture objects) have direct entries in the configuration set list. A display part list may also be used for the data objects that show this list itself. Also, the information showing these lists themselves may be distinguished from other data objects or from the display parts 52 by the use of flags or the like.

Furthermore, the configuration set list also has information for configuring the operation screen of a unit, has position information with respect to the function menu 51 or the screen size required to display these configuration set parts 55, and has information about background color, background pattern, and so on as unique information in the header, etc.

The configuration set list has information indicating priority when the controller displays these configuration set parts. For instance, when it is specified that a lower value for this priority will be a higher priority, and when a controller with a screen that is smaller than the screen size the device is supposed to have displays the function menu 51 of this device, the configuration set parts having a priority with a low value will be displayed on the first page of the display screen.

As shown in FIG. 9, there may be a plurality of configuration set parts in the function menu 51, and there may be display parts 52 which do not belong to the configuration set parts. Here, the function menu 51 serves to show the menu of a VTR, and the configuration set parts 55 have the display parts 52 of the deck component of the VTR, which is a part thereof.

The display parts 52 having entries in the configuration set list, just as in the first embodiment, are parts used for displaying icons, buttons, sliders, check boxes, text entries, and so forth, and this display part list has unique information such as the type of display parts 52 and information required for each of the display parts 52 (such as the variable range, step value, and initial value in the case of a slider, for instance).

There are entries such as text objects or still picture objects in this display part list, and these entries have unique information about the various data objects such as the size of still pictures or flags indicating the type (format) of a still picture or text, as well as information about the position on the screen, which is shown as a relative position with respect to the configuration set parts that device is supposed to have.

Here, the information about position on the screen was contained in the entries of the various data objects, but may instead be contained in the entries of the display part list.

FIG. 10 is an explanatory diagram of an example of the display screen in this embodiment. The function menu 51 shown in FIG. 9 is an example in which the controller screen size is the same as or larger than the screen size the device is supposed to have in the function menu 51 of the function information table 8.

In this case, the controller displays on the screen the display parts 52 as directed by the function menu 51 of the function information table 8, the configuration set part, and the display parts 52. The data objects (still pictures and text data) showing the function menu 51 itself are displayed as titles on the screen of the controller, but the data objects that show the configuration set parts 55 themselves are not displayed. Furthermore, it is not displayed that the display parts 52 belong to the configuration set parts 55, such as by surrounding the display parts 52 belonging to a single configuration set part with a box or the like.

When it is possible to perform display in which it is easier for the user to understand if data objects that show the configuration set parts 55 themselves are displayed or if it is displayed that the display parts 52 belong to the configuration set parts 55, then the configuration set parts 55 or the data objects may have flags indicating that these are displayed.

Figure 10B:
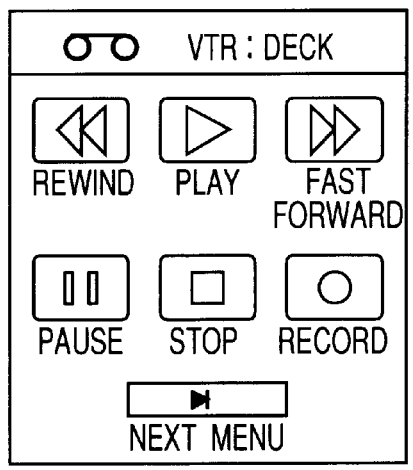
FIG. 10B is a first explanatory diagram of a small screen display in the fourth and seventh embodiments.
Figure 10C:
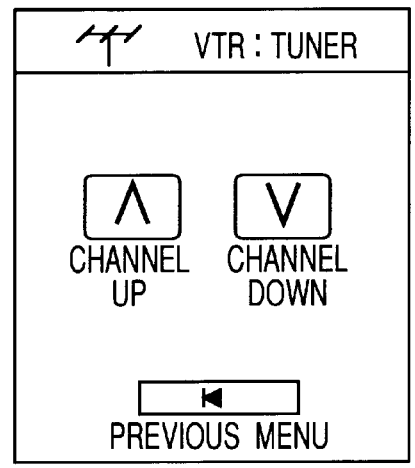
FIG. 10C is a second explanatory diagram of a small screen display in the fourth and seventh embodiments.

FIGS. 10B and 10C are examples of when the screen size of the controller is smaller than the screen size the device is supposed to have in the function menu 51 of the function information table 8. Here, we will assume that the controller is able to display in a single screen just the configuration set part that indicates the VTR deck component.

The controller uses the screen size information in the function menu 51, the size of the configuration set parts among the configuration set parts, and so on to detect that the function menu 51 is not displayed as directed by the device, but can be displayed in configuration set part units, and produces and displays a page for every configuration set part.

In this case, which configuration set part will be assigned to which page is determined by the priority among the configuration set parts. The controller assigns the configuration set parts to pages in the order of highest priority first. For instance, as shown in FIG. 10B, the menu of the deck component of the VTR, which has a high priority, is displayed on the first page.

Here, navigation information conveyed to the user by an icon showing "next menu" ("next menu" in FIG. 10B and "previous menu" in FIG. 10C) is independently added by the controller.

Thus, when the device displays the menu specified by the function menu 51 on a plurality of pages, navigation information such as a scroll bar or icons for displaying the next page or previous page is produced independently by the controller and displayed on the display screen.

Page up and down keys may be provided to a pointing device such as a remote control here, allowing the displayed page on the operation screen to be controlled with these keys. Furthermore, data objects (still pictures and text data) showing the configuration set parts 55 themselves are used as captions on the display screen of the controller.

When the user clicks on the icon indicating "next page" in the operation screen in FIG. 10B, the controller detects this operation with the display/function selection means 14, and displays on the screen the configuration set part (VTR tuner) indicating the next priority, for example. Text data and an icon indicating the "previous menu" are displayed here independently by the controller. While not depicted, the display parts 52 not belonging to the configuration set parts are displayed on a page after all the configuration set parts. The display parts 52 not belonging to the configuration set parts may have flags indicating priority, in which case even those display parts 52 not belonging to the configuration set parts can be displayed with the appropriate priority on the display screen.

The configuration set parts contained information about priority in this embodiment, but the identifiers (such as ID) of the configuration set parts may also be used, and a lower value of an identifier can be treated as a higher priority, allowing the same effect to be obtained.

The configuration set parts 55 can also be used hierarchically, and there may be separate configuration set parts 55 among the configuration set parts 55. In this case it is possible to partition the display parts 52 more finely, allowing for even more flexibility in the screen size of the controller.

Furthermore, just as in embodiments 1, 2, and 3, there may be layout information showing the layout relationship to be assumed by the configuration set parts 55 with other configuration set parts 55 (layout information showing layout in proximity), and even when only a display screen that is smaller than the screen size the device is supposed to have can be used with the controller, but a plurality of configuration set parts can be displayed, an operation screen that is easy for the user to understand and operate can still be provided by rearranging the display parts according to the layout information or by dividing the display into a plurality of pages.

As discussed above, with the present invention, a device has a plurality of display parts that make up the operation screen of this device, and configuration set parts that indicate a set consisting of a number of the above-mentioned display parts, and a controller reads these display parts and configuration set parts from this device and displays the display parts on a display screen according to the information of the configuration set parts, and as a result, even when only a display screen that is smaller than the screen size the device is supposed to have can be used with the controller, and the menu of the device cannot be displayed completely due to limitations such as the resolution of the screen or the effect of other display categories, the intent of the person who created the menu can be conveyed to the user even for controllers of different screen sizes. Also, the controller is able to handle the display parts and display them on the screen in configuration set part units, which simplifies processing.

Also, because the various configuration set parts have information indicating the priority of the display, even when the controller only has a display screen that is smaller than the screen size the device is supposed to have, it is possible for the controller to display the information on the screen in the order of its importance to the user, the result of which is a display screen that is easier to view. Furthermore, the menu producer is able to create an optimal design for a given screen size more freely, and is also able to include in the design such considerations as how the individual screens appear for different screen sizes, and particularly the division of the pages and the relationship between the preceding and succeeding pages.

Because the configuration set parts have a hierarchical structure, the menu producer is able to assume more screen sizes in the production of the device menus, and the controller can display variously suitable menu screens for more screen sizes. Furthermore, the device has a menu consisting of a plurality of display parts showing the operation screens of this device, the above-mentioned controller reads these display parts from this device, and when the size of this menu is larger than the display screen of the controller, the controller divides the display into a plurality of pages the same size or smaller than the above-mentioned display screen, and produces information about navigation between these plurality of pages and displays this information on the above-mentioned display screen, and as a result, even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by dividing the display into a plurality of pages. Furthermore, controllers of a variety of display screen sizes can be easily accommodated by virtue of the controller having the initiative in regard to the production of information about navigation between these plurality of pages.

Fifth Embodiment: Operation information

The fifth embodiment will be described using FIGS. 11 to 13. When the up arrow button, down arrow button, right arrow button, or left arrow button provided to the controller is pressed, information about which icon the selection will switch to from the icon currently selected is contained as an attribute of the currently selected icon.

The fifth embodiment of the present invention will now be described through reference to the figures.

FIG. 11 is structural diagrams of display parts illustrating the fifth embodiment of the present invention. Here, everything but the display parts are the same as in the first embodiment, and will therefore not be described.

Figure 11A:
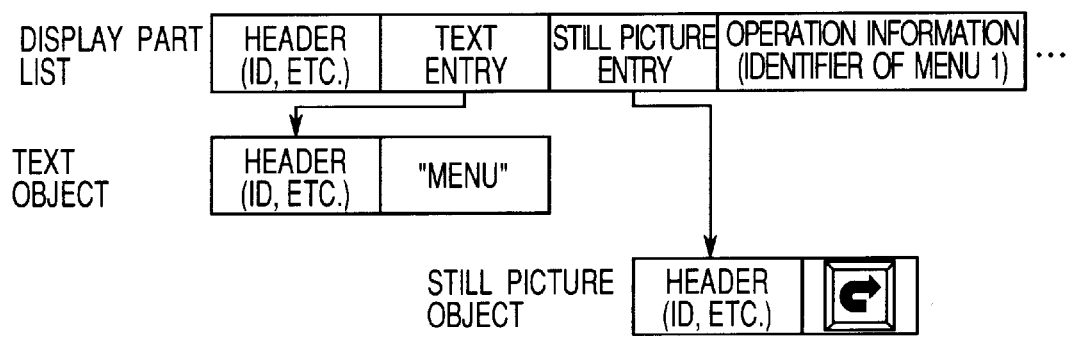
FIG. 11A is a structural diagram of one display part having operation information in the fifth embodiments.

In FIG. 11A, the display parts 52 in the function information table 8 (not shown) of the device have operation information showing such information as the switching of the display screen or the movement of the cursor within the display screen. With this embodiment, the device has a plurality of menus, and the operation information of the display part showing "menu 1" is an identifier (such as ID) of a different menu from "menu 1" to which this display part belongs. Here, the plurality of menus have entries as a function menu 51 in the device information list or function menu list of FIG. 1, and it is possible to use this information to read from the device to the controller. The function information table 8 does not necessarily have to have the configuration shown in FIG. 1, and the configuration may instead be such that the function menu list showing the menus is read directly, without following the entries from the function menu list or device information list, by predetermining the ID's of a plurality of function menus 51 or making an inquiry to the device.

Figure 11B:
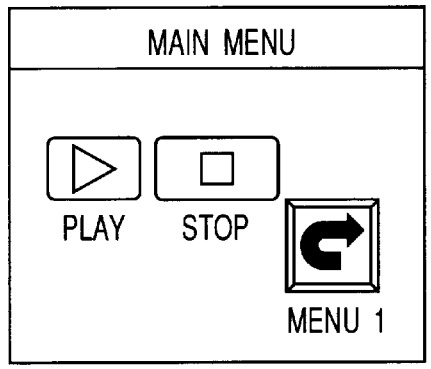
FIG. 11B is an explanatory diagram of the display screen of the main menu in the fifth embodiment.

When the controller reads the "main menu," it also reads the display parts 52 showing "menu 1" that has entries in the function menu 51 that shows this "main menu," and the display parts shown in FIG. 11A are displayed as shown in FIG. 11B. Here, the display parts 52 other than "menu 1" are the same as the display parts 52 shown in FIG. 1, but there is no need for relationship information. The configuration may also be such that the display part list is read individually by, for example, first reading only the function menu list, and acquiring the ID's of the display parts 52 given in the various entries.

Figure 11C:
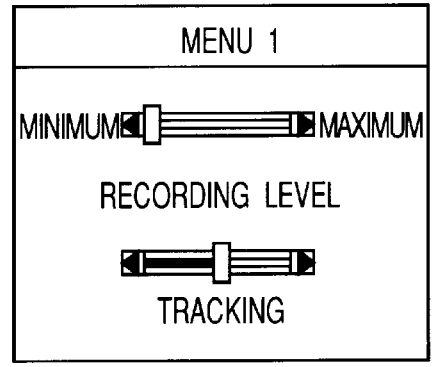
FIG. 11C is an explanatory diagram of the display screen of menu 1 in the fifth embodiment.

When the display parts 52 of "menu 1" have been selected in the main menu shown in FIG. 11B (when the cursor is over these display parts and the select key of the remote control 22 is pressed in that state), menu 1 shown in FIG. 11C is displayed on the screen of the controller. The displayed menu here is a sub-menu that assists the main menu.

There is also a help menu that gives explanations of the functions of the various display parts in display part units of the device, and each display part has operation information for its respective help menu as an identifier for the help menu, providing the user with an operation screen that is easy to use and which allows the help menu for that display part to be displayed on the screen or an explanation of each function and each menu to be displayed when the help button on the remote control 22 is pressed while the cursor is on a display part. The operation information for the help menu is differentiated by flags or the like that show other operation information and the help menu operation information.

Thus, with a simple configuration, the menu producer can assume the operation of the user in producing a menu, so the user can be provided with an operation screen that is easier to use. Furthermore, if the controller reads a plurality of menus ahead of time, there will be no need to read the information on the display screen from the device every time the user performs an operation, so the display screen can be changed more quickly.

With this embodiment, the display screen of the controller was displayed by switching, but the main menu and menu 1 may also be displayed superimposed and menu 1 made active (a state in which menu 1 can be operated by the user) by overlap display or the like, or the main menu may be reduced in size, and menu 1 displayed and activated in the resulting empty space.

Furthermore, the configuration set parts shown by the operation information may be activated (put in a state in which the user can operate the display parts among the configuration set parts) when the menu has configuration set parts and the display parts 52 having the ID's of the configuration set parts as operation information are used to select the icon, in which case the same effect is obtained.

Also, when the display parts 52 have the identifiers of other display parts 52 as operation information, and the display parts 52 having operation information are selected, the cursor may be moved to the display parts 52 shown by this operation information.

Figure 12:
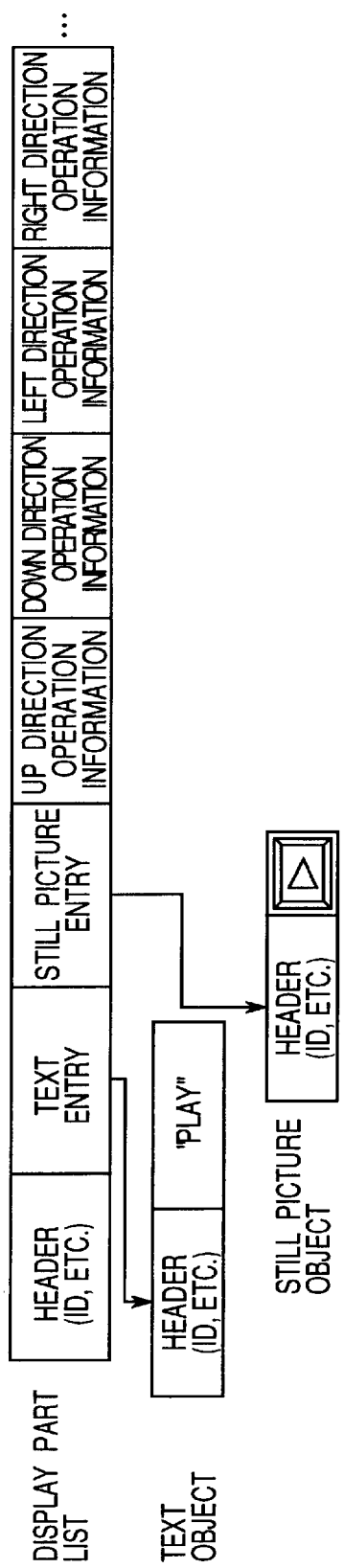
FIG. 12 is a structural diagram of a display part in the fifth embodiment.

For instance, as shown in FIG. 12, the display parts 52 have operation information indicating cursor movement in the up, down, left, and right directions within the display screen. The operation information here is the identifiers (such as ID) of the display parts. An example of this operation information is the operation information in the up, down, left, and right directions shown in FIG. 13A. Here, the up operation information of the display part 52 indicating play is the identifier (ID) of the display part 52 itself that indicates "play," the down operation information is the identifier (ID) of the display part 52 that indicates "stop," the left operation information is the identifier (ID) of the display part 52 that indicates "rewind," and the right operation information is the identifier (ID) of the display part 52 that indicates "fast forward." These display parts 52 are displayed as in FIG. 13B by means of the position information included in unique information such as the respective headers, and when the cursor (which indicates the focus of the user) is on the display part 52 showing "rewind," the user uses the remote control 22 shown in FIG. 4, for example, to press the "right button" on a cross-shaped directional key indicating the directions up, down, left, and right, for example, whereupon the cursor moves to the display part 52 showing "fast forward" according to the operation information. Similarly, the cursor moves to the display part 52 showing "play" when the "up button" is pressed, the cursor moves to the display part 52 showing "stop" when the "down button" is pressed, and the cursor does not move when the "left button" is pressed. Thus, with a simple configuration, the menu producer can assume the operation of the user in producing a menu, so the user can be provided with an operation screen that is easier to use.

The processing for these cursor movements is performed by the controller according to the operation information directed by the device to the various display parts, and there is no need for inquiry to the device. This makes it possible for changes in the display screen to be carried out more quickly.

For example, when only a display screen that is smaller than the screen size the device is supposed to have can be used with the controller, and the menu of the device cannot be displayed completely, even if the positions of the display parts are rearranged by the controller, the user can be simply and clearly apprised of the provision of the various functions and menus by specifying the movement of the cursor with operation information, so an operation screen that is easy to operate can be provided.

It was said here that when the operation information is an identifier of a display part, the cursor is moved to the display part showing the operation information within the display screen, but when the display parts 52 specified in the operation information are not all on the same page because the controller has rearranged the display parts and divided them into a plurality of pages, then the display pages may be updated by screen scrolling, screen updating, or the like, the display part given in the operation information displayed on one page, and the cursor moved to this display part.

As discussed above, with this embodiment, a device has display parts having operation information for changing the display of the operation screen by operation from the user, and a menu consisting of a plurality of display parts showing the operation screen, and the controller reads these display parts and configuration set parts from this device and displays the menu of the device on the display screen, and the display of the display screen is changed by operation from the user according to the operation information, so an operation screen that is easy to understand can be provided to the user, and since there is no need to read the information of the display screen from the device every time the user performs an operation, the display screen can be changed more quickly. Furthermore, when only a display screen that is smaller than the screen size the device is supposed to have can be used with the controller, even if the positions of the various display parts have been rearranged by the controller, the user can be simply and clearly apprised of the provision of the various functions and menus by defining the movement of the cursor with operation information, so an operation screen that is easy to operate can be provided.

Furthermore, using identifiers showing other display parts for the operation information makes it simple to define the movement of the cursor, and allows the provision of the various functions shown by the display parts to be presented in a straightforward manner to the user, so the user is able to learn of the relationship between the functions intuitively, and since there is no need to ask the device about cursor movement, operation is easier.

Also, if the menus have configuration set parts, and the operation information is identifiers indicating configuration set parts, the user can be easily apprised of the association between the various configuration set parts, allowing the provision of an operation screen that is easier to use.

If the device has a plurality of menus, and if display parts having as operation information identifiers indicating other menus are provided within the menus, then menus can be switched with ease, even though there is no button for menu switching or the like on the remote control, etc. Furthermore, if the device has a help menu giving explanations of the functions shown by the various devices, and if the display parts have as operation information identifiers indicating the help menu, then an operation screen that can display explanations of the various functions and menus with ease and that is easier to use can be provided to the user.

Sixth Embodiment: Overview of channel information

The sixth embodiment will be described using FIGS. 14 to 16. While a local display, including icons or the like, is being performed, information about the video sent to the background thereof is given to the attributes of the icons.

The sixth embodiment of the present invention will now be described through reference to the figures.

Figure 14:
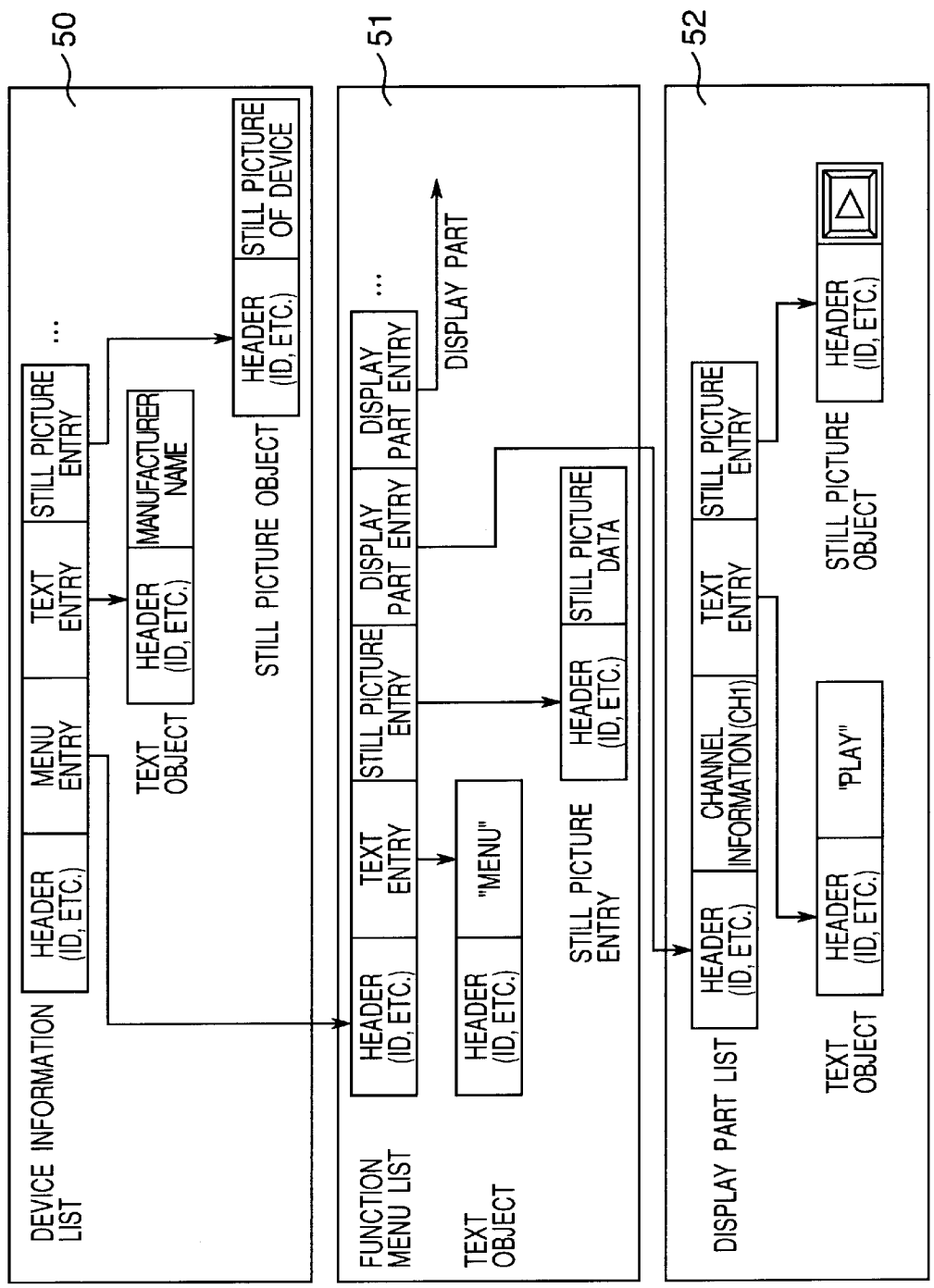
FIG. 14 is a structural diagram of a function information table in the sixth embodiment.

In FIG. 14, the display part list for the various display parts 52 that use the transmission line 1 to transmit, receive, and process stream data (synchronous data) such as video and audio data has channel information showing the channel numbers for transmitting synchronous data over the transmission line 1. Here, even when a channel for the transmission of asynchronous data is used, channel information should be contained in the display part list of the display parts 52 showing the functions of transmitting and receiving asynchronous data using the transmission line 1.

The display part 52 in FIG. 14 indicates the playing of the VTR, and has a play icon (still picture) and text "play". The display part list showing this display part 52 has channel information (1 channel). This channel information indicates a channel that is partitioned by a method such as time sharing a band of the transmission line 1 that handles synchronous data, and the number of this channel is listed as channel information. This channel information is used in sending out stream data (such as video or audio data) from the device when this display part 52, which means play the VTR, has been selected by the user.

The channel information may be contained in the header of the display part list, for example. Channel information may also be provided by type of stream data, such as video or audio.

Figure 15:
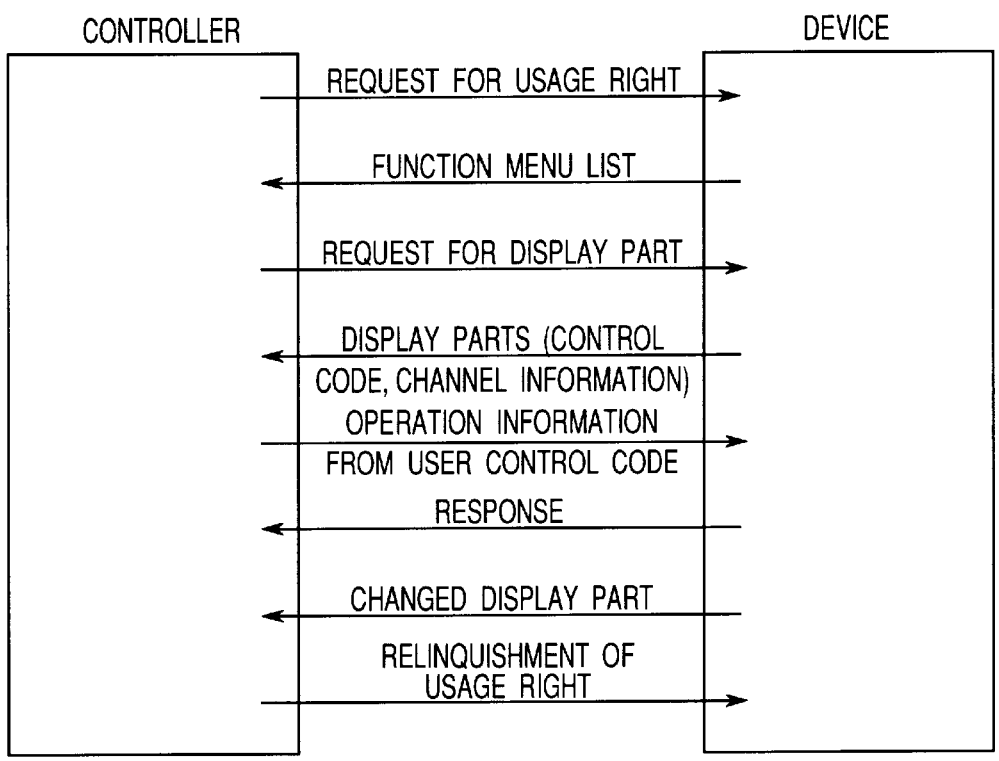
FIG. 15 is an explanatory diagram explaining control related to the function menu in the sixth embodiment.
Figure 16:
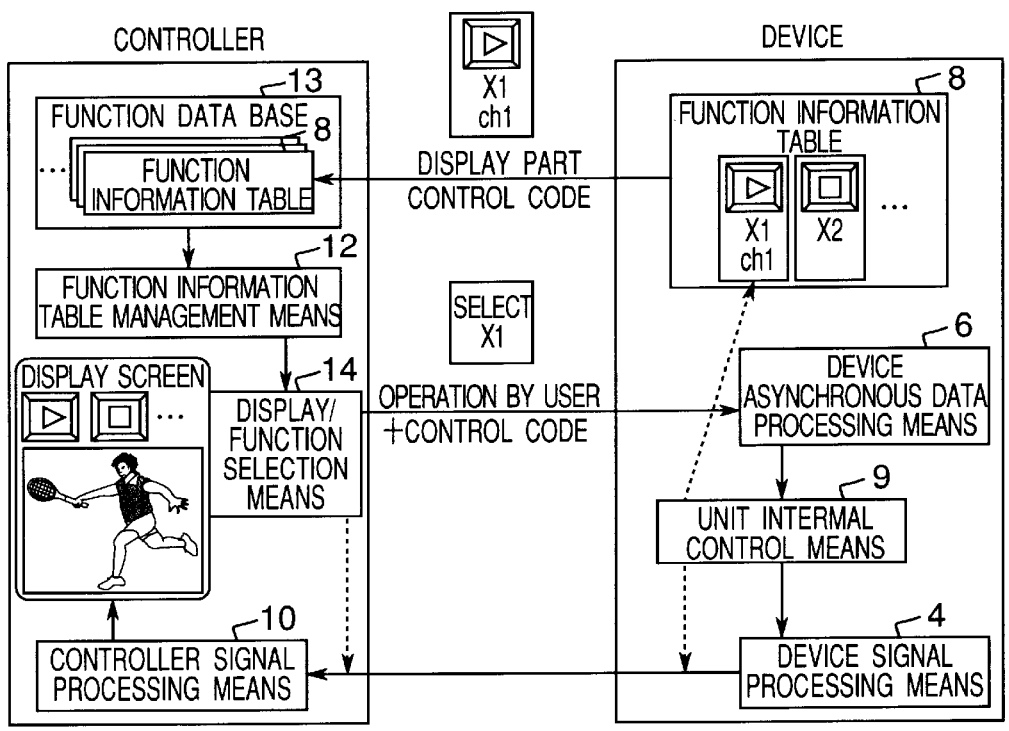
FIG. 16 is an explanatory diagram of the network control system in the sixth embodiment.

FIG. 15 is an explanatory diagram explaining control related to the function menu in the sixth embodiment, and FIG. 16 is an explanatory diagram explaining control related to the display part. The operation of the controller and device will be described using these figures.

First, when a device is connected to the transmission line 1, the controller on this transmission line 1 recognizes a new device by bus resetting, in the case of a 1394 bus, for instance, reads the device information parts 50 of the function information table 8 through the transmission line 1 from the new device as directed by the function information table management means 12, and reads and registers the device information parts 50 of this function information table 8 in the function data base 13 of the controller. The device information parts 50 of the function information table 8 here are, for example, as shown in FIG. 14, and have text objects indicating the manufacturer name, data objects indicating the device (still picture objects or text objects), and so forth. The various parts in the function information table 8 do not necessarily have to physically have the links shown in FIG. 14 (association between entries and entities), as long as they can be accessed from the controller in the various object units.

Here, the various function information tables 8 in the controller are distinguished by unique ID's for each device, for example, and take on a list structure having an entry for every device. The function information tables 8 may be read all at once here, or just some of the function information tables 8 may be read. They may also be read in object or list units.

If there is enough memory space in the controller here, the configuration may be such that when a new device is connected, for example, links are first followed from the device information parts 50, and the function information tables 8 are all read.

The display/function selection means 14 refers to the device information parts 50 among the function information tables 8 in the function data base 13 through the function information table management means 12.

When the display/function selection means 14 displays a list of the devices connected to this controller, the display/function selection means 14 uses the function information table management means 12 to read the data objects (such as text objects or still picture objects) among the device information parts 50 from all of the function information tables 8 registered in the function data base 13, and displays them on the screen.

Not all of the data objects among the device information parts 50 need to be displayed on the screen, and may be selected and displayed as needed.

Here, if there are audio objects among the device information parts 50, they are not used in the display of the list of devices; for example, when a new device is connected in a state in which a list of devices has already been displayed, the still picture object of this new device is displayed and, if there is an audio object, it is played. Alternatively, it is played when the device information parts 50 are selected by the user.

When, for example, the user selects the still picture object of a device using the pointing function (such as a directional key) of a remote control, the display/function selection means 14 notifies the function information table management means 12 that the still picture of the device has been selected, and requests the function menu 51 for that device.

The control related to the function menu will now be described using FIG. 15.

If there is no function menu for that device here, then the function information table management means 12 uses the controller asynchronous data processing means 11 to request the right to use that device, as shown in FIG. 15. If use is granted for the device for which a usage right has been requested, the identifier (such as a unique ID) of that controller is stored in the function information management means 17 of the device, and a menu list (function menu list) containing the configuration of the menus showing the functions of the device is fetched from the function information table 8 via the function information management means and sent to the controller. The controller uses the function information table management means 12 to store this function menu list in the function information table 8 indicating this device. Here, a list of the display parts 52 included in the menu may be displayed, or just a list of the identifiers (ID's) of the display parts 52 or the like may be displayed.

Meanwhile, when no usage right is granted, the device returns error information, and the controller displays on the screen that this device cannot be used, thereby notifying the user.

Permission for the usage right to a device here means permitting a controller to control that device, but may also mean just permitting the display of the function menu, or may mean granting an exclusive right to the device.

Furthermore, the function information table management means 12 fetches the identifiers (ID's) of the display parts 52 belonging to the function menu list from the stored function menu list from the entry information for the display parts 52 and so on. The function information table management means 12 requests text objects, still picture objects, or display parts 52 belonging to the function menu 51 using the controller asynchronous data processing means 11 and obtains the display parts 52 as the response to this, and the function information table management means 12 stores these in the function information tables 8. Here, the function information tables 8 in the controller do not need to be in the same format as the function information tables 8 in the device, but should include the information of the function information tables 8 in the device.

Using the function information table management means 12, the display parts 52 of the various functions listed in the function menu list are read out from the function information table 8 of this device, and all the display parts 52 corresponding to the respective functions are displayed on the screen. By repeating this for all of the display parts 52 belonging to the function menu 51, it is possible to display the display parts 52 showing all of the functions of this device.

Here, the distinction between the various display parts 52 in the controller is performed with the unique ID of the device and the ID's of the display parts 52 attached by the device.

The configuration may also be such that the controller newly reattaches the ID's of the display parts 52, and the controller has a conversion table for these new ID's and (the unique ID of the device+the ID's attached to the device). The display parts 52 containing ID's are included in this function information table 8.

When the user selects a certain display part 52, the control code (ID) of this display part 52 and the operation information from the user are sent by the controller to the device. Here, when any display part 52 belonging to the function information table 8 changes, the device sends the changed display part 52 to the controller in response to the transmission from the controller. In this case, the device may return the ID of the display part 52 to the controller, and if needed, the controller may read and display this display part 52 from the device.

When the contents of the display parts 52 of the function information table 8 in the device have spontaneously changed, such as when the device has changed the still picture of the display parts 52 showing the functions of a VTR deck because the tape has been removed from the VTR and the deck can no longer be operated (for instance, when the still pictures of the various functions are replaced with still pictures to which an "X" has been added in order to show that the functions will not work), the device spontaneously sends the changed display parts 52 to the controller having the usage right.

When the user then selects a display part 52, the control code (ID) of this display part 52 and the operation information from the user are sent by the controller to the device, and the response is similarly processed. Repeating this allows the device to be controlled from the controller.

When the controller stops using this device, the controller notifies the device that it is relinquishing its usage right, and the use of the device ends. At this point, at the same time, the channel of the transmission line 1 that was in use at the directive of this controller is released by the device. Thus, the controller is prevented from disappearing while the transmission line 1 is still being used, which allows the transmission line 1 to be utilized more efficiently.

The operation when the user selects the display parts 52 will now be described using FIG. 16.

When the user selects a display part 52 showing the play function of the device, for example, using the pointing function of a remote control or the like, the display/function selection means 14 sends the ID (such as X1) of this display parts 52 attached by the device as a control code to the device along with the operation information from the user (such as "select"). In other words, when the cursor is moved over this display part 52 with the four-way directional key of a remote control, and the select button is pressed and then released, the ID (control code: X1) of this display part 52 and the operation information from the user ("select") are sent to the device.

It is also possible to send more detailed user operation information to the device, and when operations such as "press," "release," "press twice" are performed on a display part 52 by operation of a remote control or pointing device, it is also possible to send this operation information to the device.

Also, rather than sending the user operation information to the device, just the control code of the display part 52 (the identifier of the data object or the display part, for example) may be transmitted to the device, which allows the configuration to be simplified.

The operation information from the user here may be encoded and sent along with the ID of the display part 52, or each may be sent as a single command (the operand being a control code such as the ID of the display part 52).

The device receives the control code (ID: X1) of the display part 52 selected on the controller and the operation information from the user ("select"), interprets the meaning of this received data with the device asynchronous data processing means 6, determines that the VTR is to be played, and outputs a directive of play to the unit internal control means 9. The unit internal control means 9 at this time reserves a band of the transmission line 1 required for the play of the VTR, and acquires a channel as a predetermined value. The play operation of the VTR is then started, and stream data is outputted to a channel (CH 1) of the transmission line 1.

Since the ID of the display part 52 was used here as a control code, there is no need for a special control code such as a command corresponding to a function to be specified with a standardized group or the like, and all of the functions had by the device can be controlled with a simple configuration.

After the controller gets a response from the device and the correct response is returned, the channel of the transmission line 1 containing the channel information (CH 1) is set to receive, the packet of stream data flowing through channel 1 of the transmission line 1 is read, and decoding and other such processing is performed by the controller signal processing means 10 for display on the display screen.

For instance, when the user selects the display part 52 showing the play function of the device, the display/function selection means 14 displays the play picture from the device on the screen when the correct response has been returned from the device. In this case, if the device wants to change the display part, the device transmits the display part 52 to be changed (including text data or still picture data) to the controller. Thus, the controller learns that the display part 52 has been changed, and overwrites the corresponding display part 52. For example, when the VTR is played, the display part 52 indicating this play state of the VTR (such as one in which the color of the still picture showing play has been inverted) is overwritten on the display part showing play by the directive of the device, which makes it possible to perform display that shows the user that the VTR is playing.

Here, a function menu showing the functions of the device is displayed on part of the display screen of the controller in the display of the stream data on the display screen of the controller. In the display of the stream data, the configuration may be such that the function menu 51 is not displayed, but is redisplayed on the screen when, for example, the user presses the menu key of the remote control 22, and since the stream data and the function menu 51 are not displayed on the display screen at the same time, the user is able to enjoy the playback of the stream data. Also, in the display of the stream data, the stream data may be displayed as a background for the function menu 51.

When the device wants to change a display part here, the device may transmit the ID of a display part 52 rather than the display part 52, in which case the controller may use this ID to read the data of the display part 52 (including text data or still picture data). Also, the ID alone, or the ID and data, may be transmitted to the controller not in display part units but in data object units.

If the device was for some reason not able to receive the control code transmitted by the controller, then the display/function selection means 14 detects that the device has not received the control code by using the response to the transmitted control code or the like, and a display part 52 independently had by the controller is displayed (displayed in a large size in a conspicuous location such as the center of the screen, for example), thereby notifying the user that control failed. The same applies when the controller transmits stream data, and the device receives it.

With this embodiment, the controller received a stream flowing in a channel of the transmission line 1, but it is also possible for the controller to direct that the stream data flowing through this channel be received by another device or controller, which makes it easy to display stream data on a plurality of screens or to copy what is being played, allows the controller to control the flow of stream data simply and freely, and allows more functions to be provided to the user.

Also, the stream data flowing through the channel in the transmission line 1 was video and audio data here, but may instead be just video or just audio, or other data (character data or print data used with a printer), and in more specific terms, may be MPEG or DV data, and as long as the function shown by a display part 52 transfers data over the transmission line 1 using a channel, any such data may be used as stream data.

Furthermore, if the display parts 52 have flags indicating the type of this stream data, stream data that cannot be handled by the controller can be detected before the controller displays this display part on the screen, and it is possible to notify the user that the function shown by this display part 52 cannot be played and displayed by this controller, which means that an operation screen which is easier to use can be provided.

Furthermore, the menu was shown for a single device in this embodiment, but it is also possible for the controller to gather display parts from a plurality of devices and to construct and display an operation screen using these display parts, in which case the fact that the various display parts have channel information makes it possible for the controller to detect whether the functions shown by the various display parts use the same channel. For instance, it is possible for the function shown by a certain display part to be displayed such that other display parts can be selected during execution, allowing visual recognition by the user to be enhanced.

Thus, if there is channel information for every display part 52, the controller can simultaneously execute a plurality of functions, making it possible to display a plurality of streams simultaneously on the controller screen (such as watching two programs at the same time), to watch one program while recording another, and so on. It is also possible for the controller to receive and display on the display screen the channels on the transmission line 1 given in the channel information even when another controller is controlling the device in question, so the user can be notified of the status of the unit being used by the other controller by means of played video/audio or the like on the display screen, and an operation screen that is easier for the user to understand can be constructed.

The device determined the channel information ahead of time in this embodiment, but after the device has received a control code from the controller, a band and channel may be reserved on the transmission line 1, and this channel information sent to the controller. For example, the configuration may be such that when the user presses the still picture (such as a play button) of a display part 52 having channel information showing that one of the channels on the transmission line 1 is being used (that is, information showing that a channel has been determined after selection of this unit), the device receives the control code of this still picture (such as a play button), the device acquires a band and channel after receipt of a control code and a still picture showing that this play button has been pressed (such as one in which the color of the still picture showing the play button has been inverted), and the display part 52 including this channel information is sent to the controller.

Also, the device may enter the channel information scheduled for use in a display part 52, and after the device receives the control code of this display part 52 from the controller, the device may reserve a band and channel and send the specified channel information as a control code response to the controller.

Furthermore, the configuration may be such that the channel information is rewritable, the device reserves a band and channel while another controller is using the device, for example, the channel information of this display part 52 in the function information table 8 is updated as needed, and the controller is notified that this display part has been changed. In this case, a change in the status of a device (such as the acquired channel of the device) by another controller can also 4be easily accommodated by displaying the output stream of the device.

As discussed above, with this embodiment, the device has display parts which make up the operation screen of the device and contain channel information that shows the channel of the transmission line, the controller reads the display parts from the device and sets the channel of the transmission line according to the channel information when handling data shown by the display parts, which makes it possible to share channel information between the controller and the device with a simple configuration, allowing the controller to control the flow of stream data with ease. Also, a plurality of data streams can be executed simultaneously if there is channel information for every display part with a device that can handle a plurality of data streams simultaneously.

The data shown by the display parts here also includes commands, messages, and so forth.

If a display part has a flag indicating the type of stream, stream data that cannot be handled by the controller can be detected before the controller displays this display part, and it is possible to notify the user that the function shown by this display part 52 cannot be used with this controller, which means that an operation screen which is easier to use can be provided.

When a device has display parts that make up the operation screen of the device, and menus composed of one or more display parts and showing the functions of the device, and when the controller requests a usage right for a device and the device grants this usage right, the device sends the controller a menu list including identifiers for the display parts that make up the above-mentioned menus of the device, which allows the controller to acquire the menus in the device by a simple procedure, allows the number of display parts in a menu list and so on to be confirmed even when there is little memory space in the controller, makes it possible to read just what is needed, and allows the menus of the device to be displayed more efficiently.

When there is a change in the display parts in a device after the controller has requested the usage right for that device, the device can easily ascertain the controller having the usage right by sending the above-mentioned changed display parts to the controller, making it possible for a notification of a change in the display parts in a device to be made efficiently when there is such a change.

When the controller relinquishes its usage right to the device, the device is notified that the usage right has been relinquished, and the channel of the transmission line that was in use at the directive of this controller is released by the device, which prevents the device from remaining in a state in which the channel of the transmission line is in use, and allows the transmission line to be utilized more effectively.

When the device releases the usage right, the functions of the device may be put in a standby status. For instance, with a VTR, play may be stopped.

Seventh Embodiment: Channel information

The seventh embodiment will be described using FIGS. 17 to 19. While a local display, including icons or the like, is being performed, information about the video sent to the background thereof is given to the attributes of the icons.

The seventh embodiment of the present invention will now be described through reference to the figures.

Figure 17:
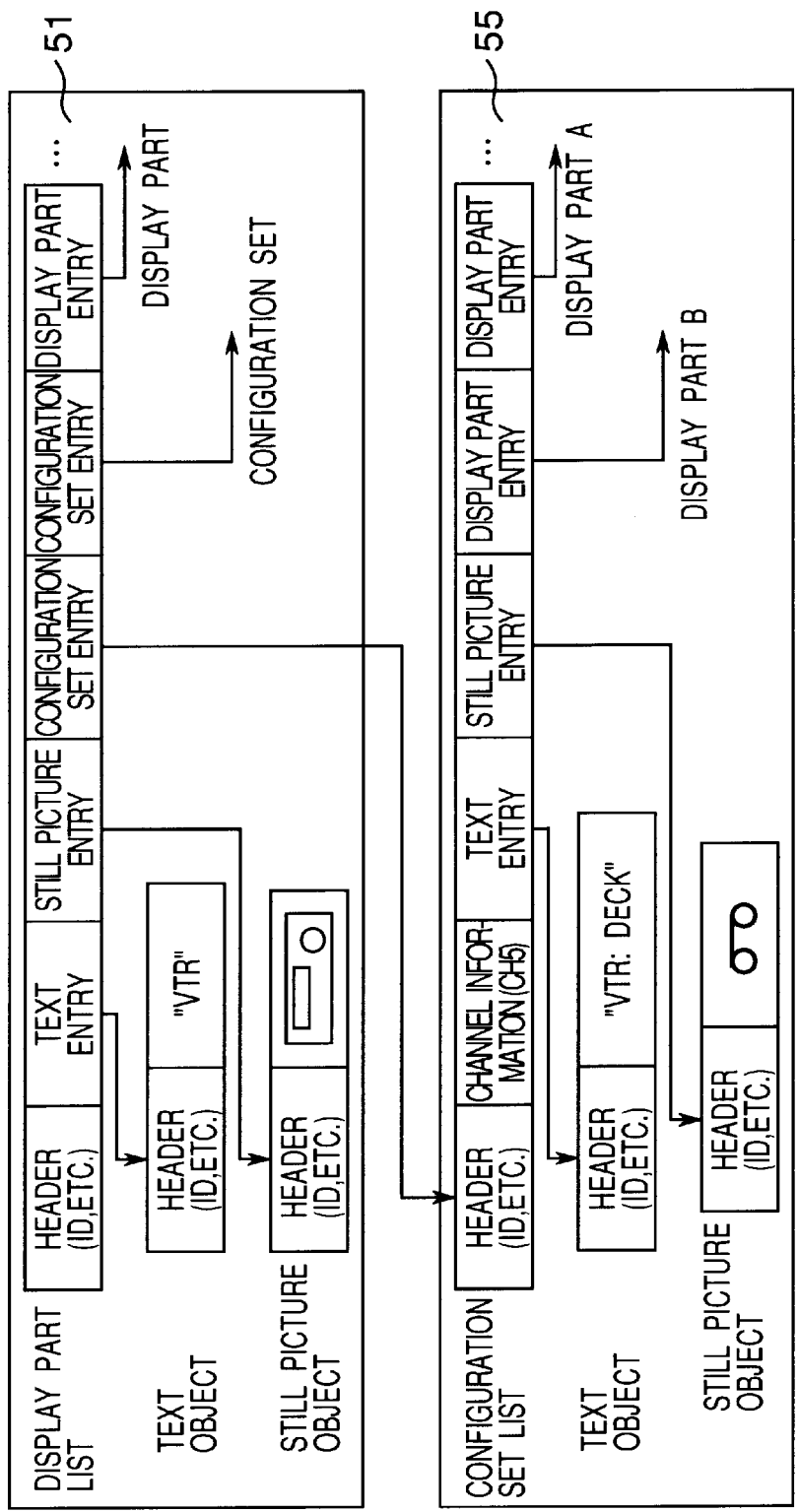
FIG. 17 is a structural diagram of the function menu and configuration set parts in the seventh embodiment.

FIG. 17 is a structural diagram of the function menu and configuration set parts in the seventh embodiment.

Here, the device information parts (not shown) and display parts (not shown) will not be described since they are the same as in the first embodiment illustrated in FIG. 14. The display parts need not contain channel information in this embodiment.

In FIG. 17, the function menu 51 in the function information tables 8 (not shown) consists of a function menu list, and has configuration set entries. These configuration set entries indicate the configuration set list.

Here, the configuration set list may be made directly accessible by the controller by predetermining the identifiers (such as ID's) of the configuration set list or by having the controller acquire the identifiers of the configuration set list by communication between the controller and the device.

The configuration set parts 55 show sets of display parts 52 in the function menu 51, and are sets of display parts 52 (display part A and display part B) that are closely related from the standpoint of function or design.

These configuration set parts 55 are configured using a configuration set list, and this configuration set list contains entries for display parts 52 (display part A, display part B, and text objects) for configuring part of the operation screen and for showing this list itself. Furthermore, there may be channel information (CH 5). Here, the channel information may be provided in the header of the configuration set list, for example.

The display parts 52 used here to show part of the operation screen are laid out using the display part list (FIG. 14), and flags showing the purpose or operation of these display parts 52 (for display, for identification, for control, etc.), or flags indicating whether there is the possibility that these functions will dynamically disappear, may be added to the entries for the various display parts 52. The display part list here does not contain channel information.

Data object entries are laid out in the display part list (FIG. 14) shown by these display part entries. Here, the entries of the various data objects (text objects and still picture objects) may be laid out directly in the function menu list, without the display part list being used, in which case it is possible for the flags indicating purpose and so on to be given in the entries of the display parts 52.

Meanwhile, the data objects (such as text or still pictures) that show this function menu list itself have direct entries in the function menu list. Furthermore, a display part list may be used for the data objects that show this list itself. The information showing these lists themselves may be distinguished from the display parts 52 or other data objects by using flags or the like.

Furthermore, the configuration set list has information for configuring the operation screen of the unit, has positional information with respect to the function menu 51 or screen size needed for displaying these configuration set parts 55, and has information about background color, background pattern, and so on as unique information in the header, etc.

The configuration set list has information in the header indicating priority when the controller displays these configuration set parts. For instance, when it is specified that a lower value for this priority will be a higher priority, and when a controller with a screen that is smaller than the screen size the device is supposed to have displays the function menu 51 of this device, the configuration set parts having a priority with a low value will be displayed on the first page of the display screen.

As shown in FIG. 17, there may be a plurality of configuration set parts in the function menu 51, and there may be display parts 52 which do not belong to the configuration set parts. Here, the function menu 51 serves to show the menu of a VTR, and the configuration set parts 55 have the display parts 52 of the deck component of the VTR, which is a part thereof.

The display parts 52 having entries in the configuration set list, just as in the first embodiment, are parts used for displaying icons, buttons, sliders, check boxes, text entries, and so forth, and this display part list has unique information such as the type of display parts 52 and information required for each of the display parts 52 (such as the variable range, step value, and initial value).

There are entries such as text objects or still picture objects in this display part list, and these entries have unique information about the various data objects such as the size of still pictures or flags indicating the type (format) of a still picture or text, as well as information about the position on the screen, which is shown as a relative position with respect to the configuration set parts that device is supposed to have.

Here, the information about position on the screen was contained in the entries of the various data objects, but may instead be contained in the entries of the display part list.

The display parts 52 belonging to the configuration set parts 55 do not have channel information here, but when these display parts 52 are functions that use a channel of the transmission line 1 to transmit stream data, then the channel information (CH 5) had by the configuration set parts 55 is used, and this channel information is shared between the controller and the device.

The function menu 51 shown in FIG. 17 is as shown in FIG. 10, which is an example in which the controller screen size is the same as or larger than the screen size the device is supposed to have in the function menu 51 of the function information table 8.

Here, the reading and control of the device information parts 50 and the display parts 52 are the same as in the first embodiment, and so will not be described again.

The control related to the function menu 51 will be described.

Figure 18:
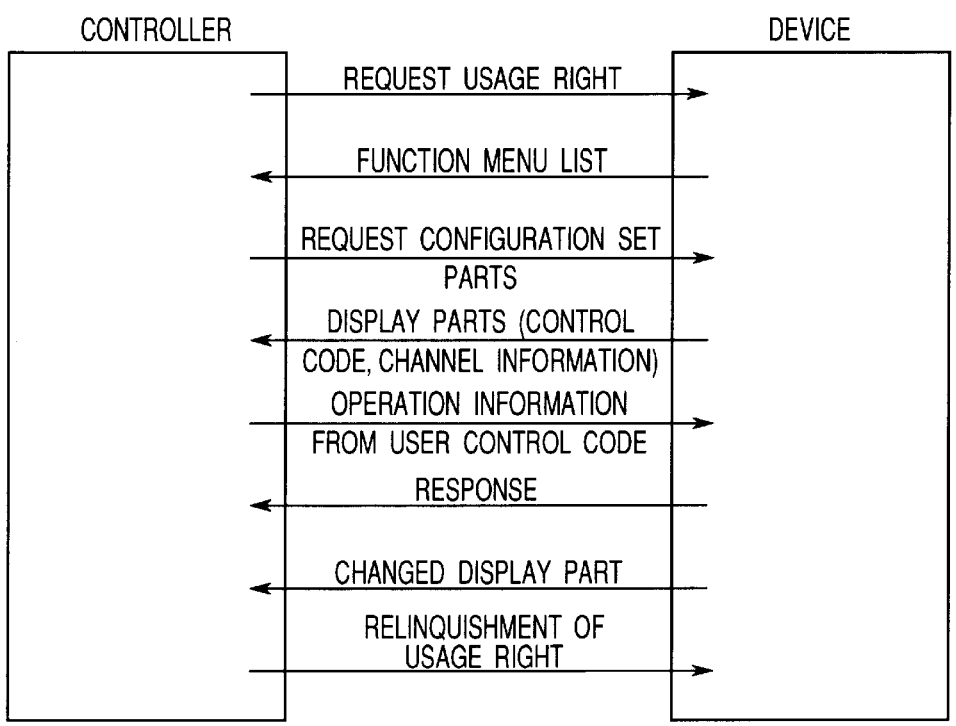
FIG. 18 is an explanatory diagram of explaining control related to the function menu in the seventh embodiment.

When there is no function menu for a device here, that is, when the controller has yet to acquire the usage right for the device, then the function information table management means 12 uses the controller asynchronous data processing means 11 to request a usage right from the device, as shown in FIG. 18. If the device for which a usage right has been requested grants this request, then the identifier (such as a unique ID) of the controller in question is stored in the function information management means 17 of the device, and the menu list (function menu list) giving the configuration of the menus showing the functions of the device is fetched from the function information table 8 via the function information management means and sent to the controller. The controller uses the function information table management means 12 to store this function menu list in the function information table 8 showing this device. Here, the menu list may be a listing of the configuration set parts 55 included in the menu and display parts 52 not belonging to the configuration set parts 55, or may just be a list of identifiers (ID's) of the configuration set parts 55 and display parts 52, for example.

Meanwhile, when a usage right is not granted, the device returns error information, and the controller displays on the screen that this device cannot be used, thereby notifying the user.

Permission for the usage right to a device here means permitting a controller to control that device, but may also mean just permitting the display of the function menu, or may mean granting an exclusive right to the device.

Furthermore, the function information table management means 12 fetches the identifiers (ID's) of the configuration set parts 55 and the display parts 52 not belonging to the function menu list from the stored function menu list from the entry information for the configuration set parts 55, the display parts 52, and so on. The function information table management means 12 requests text objects, still picture objects, configuration set parts 55, or display parts 52 not belonging to the configuration set parts 55 using the controller asynchronous data processing means 11 and obtains the configuration set parts 55 and the display parts 52 as the response to this, and the function information table management means 12 stores these in the function information tables 8. Here, the function information table 8 in the controller do not need to be in the same format as the function information tables 8 in the device, but should include the information of the function information table 8 in the device. The various configuration set parts 55 and the various display parts 52 not belonging to the configuration set parts 55 may be read in any order.

The identifiers (ID's) of the display parts 52 belonging to the function menu list from the function menu list stored in the controller are fetched from the entry information of the display parts 52, etc. The function information table management means 12 requests text objects, still picture objects, or display parts 52 belonging to the configuration set parts 55 using the controller asynchronous data processing means 11, obtains the display parts 52 as the response to this, and repeats this for all the display parts 52 belonging to the configuration set parts 55, and the function information table management means 12 stores these in the function information tables 8.

Next, using the function information table management means 12, the display parts 52 of various functions listed in the function menu list are read out from the function information tables 8 of this device, and all of the display parts 52 are displayed on the screen. By repeating this for all of the display parts 52 belonging to the function menu 51, it is possible to display display parts 52 showing all of the functions of this device. The configuration here may also be such that all of the configuration set parts 55 and display parts 52 belonging to the function menu 51 are read at once.

When the user selects a certain display part 52, the control code (ID) of this display part 52 and the operation information from the user are sent by the controller to the device. Here, when any display part 52 belonging to the function information table 8 changes, the device sends the changed display part 52 to the controller in response to the transmission from the controller. In this case, the device may return the ID of the display part 52 to the controller, and if needed, the controller may read and display this display part 52 from the device.

When the user then selects a certain display part 52, the control code (ID) of this display part 52 and the operation information from the user are sent by the controller to the device, and the response is similarly processed. Repeating this allows the device to be controlled from the controller.

When the controller stops using this device, the controller notifies the device that it is relinquishing its usage right, and the use of the device ends. At this point, at the same time, the channel of the transmission line 1 that was in use at the directive of this controller is released by the device. Thus, the controller is prevented from disappearing while the transmission line 1 is still being used, which allows the transmission line 1 to be utilized more efficiently.

Screen display on the controller will now be described.

The controller displays the various display parts 52 on the screen as directed by the function menu 51 of the function information table 8, the configuration set part, and the display parts 52. The data objects (still pictures and text data) showing the function menu 51 itself are displayed as titles on the screen of the controller, but the data objects that show the configuration set parts 55 themselves are not displayed. Furthermore, it is not displayed that the display parts 52 belong to the configuration set parts 55, such as by surrounding the display parts 52 belonging to a single configuration set part with a box or the like.

When it is possible to perform display in which it is easier for the user to understand if data objects that show the configuration set parts 55 themselves are displayed or if it is displayed that the display parts 52 belong to the configuration set parts 55, then the configuration set parts 55 or the data objects should have flags indicating that these are displayed.

Here, the display parts 52 indicated by "rewind," "play," "fast forward," "pause," "stop," and "record" belong to the configuration set part 55 indicated by "VTR: deck," while the display parts 52 indicated by "channel up" and "channel down" belong to the configuration set part indicated by "VTR: tuner." The configuration set parts indicated by "VTR: deck" and "VTR: tuner" have their own respective channel information (CH 5 and CH 6). Thus, among the display parts 52 shown in FIG. 10A, out of "rewind," "play," "fast forward," "pause," "stop," and "record," the functions other than "stop," which does not handle stream data, use channel information CH 5, while the display parts 52 indicated by "channel up" and "channel down" use CH 6.

Here, when the controller displays stream data, it may be displayed along with the menus that produce the device, or only the stream data may be displayed and the menus displayed once again by operation of the remote control 22 on the part of the user.

Therefore, it is possible for different channel information to be contained in various function units. For example, it is possible for deck playback to be performed simultaneously while a tuner program is watched on a different channel.

FIGS. 10B and 10C are examples of when the screen size of the controller is smaller than the screen size the device is supposed to have in the function menu 51 of the function information table 8. Here, we will assume that the controller is able to display in a single screen just the configuration set part that indicates the VTR deck component.

We will assume here that it is possible here for the display screen of the controller to be in various configuration set part units, but display in function menu units is impossible.

Here, the reading and control of the device information parts 50 and the display parts 52 are the same as in the first embodiment, and so will not be described again.

When there is no function menu for a device on the controller here, that is, when the controller has yet to acquire the usage right for the device, then the function information table management means 12 uses the controller asynchronous data processing means 11 to request a usage right from the device, as shown in FIG. 18. If the device for which a usage right has been requested grants this request, then the identifier (such as a unique ID) of the controller in question is stored in the function information management means 17 of the device, and the menu list (function menu list) giving the configuration of the menus showing the functions of the device is fetched from the function information table 8 via the function information management means and sent to the controller. The controller uses the function information table management means 12 to store this function menu list in the function information table 8 showing this device. Here, the menu list may be a listing of the configuration set parts 55 included in the menu and display parts 52 not belonging to the configuration set parts 55, or may just be a list of identifiers (ID's) of the configuration set parts 55 and display parts 52, for example.

Meanwhile, when a usage right cannot granted, the device returns error information, and the controller displays on the screen that this device cannot be used, thereby notifying the user.

Permission for the usage right to a device here means permitting a controller to control that device, but may also mean just permitting the display of the function menu, or may mean granting an exclusive right to the device.

The controller then reads the configuration set list showing the configuration set parts 55, as shown in FIG. 18. Thus, the controller detects that the function menu 51 cannot be displayed as directed by the device, but that display is possible in configuration set part units, which it detects from the screen size information given in the header of the function menu list in the function menu 51, from the size of the configuration set part given in the header of the configuration set list in the configuration set parts 55, or the like.

Therefore, the function information table management means 12 fetches from the stored function menu list the identifier (ID) of the display part 52 belonging to the configuration set parts 55 with the highest priority given in the header of the configuration set list out of the configuration set parts 55 belonging to the function menu list, requests text objects, still picture objects, or display parts 52 belonging to the configuration set parts 55 using the controller asynchronous data processing means 11 and obtains the display parts 52 as the response to this, and the function information table management means 12 stores these in the function information tables 8. Here, the function information tables 8 in the controller do not need to be in the same format as the function information tables 8 in the device, but should include the information of the function information tables 8 in the device.

Next, the function information table management means 12 is used to read the display parts 52 of various functions listed in the configuration set list from the function information tables 8 of this device, and display all of the display parts 52 on the screen. By repeating this for all of the display parts 52 belonging to the function menu 51, it is possible to display on the screen the display parts 52 showing all of the functions included in the function units shown by the configuration set part. In other words, the controller reads and displays the information in the function information tables 8 of the device in configuration set part units 55.

Thus, when the controller switches the display screen to the next screen, the above processing is repeated and the configuration set part 55 having the next priority is displayed. At this point, the information of the previous configuration set part 55 may be deleted from the controller, which allows the controller to comprise less memory space.

When the user selects a certain display part 52, the control code (ID) of this display part 52 and the operation information from the user are sent by the controller to the device. Here, when any display part 52 belonging to the function information table 8 changes, the device returns the changed display part 52 to the controller in response to the transmission from the controller. In this case, the device may return the ID of the display part 52 to the controller, and if needed, the controller may read and display this display part 52 from the device.

When the user then selects a display part 52, the control code (ID) of this display part 52 and the operation information from the user are sent by the controller to the device, and the response is similarly processed. Repeating this allows the device to be controlled from the controller.

When the controller stops using this device, the controller notifies the device that it is relinquishing its usage right, and the use of the device ends. At this point, at the same time, the channel of the transmission line 1 that was in use at the directive of this controller is released by the device. Thus, the controller is prevented from disappearing while the transmission line 1 is still being used, which allows the transmission line 1 to be utilized more efficiently.

Screen display on the controller will now be described.

The controller detects that the function menu 51 cannot be displayed as directed by the device, but that display is possible in configuration set part units, which it detects from the screen size information given in the header of the function menu list in the function menu 51, from the size of the configuration set part given in the header of the configuration set list in the configuration set parts 55, or the like, and produces and displays a page for every configuration set part.

In this case, the decision as to which configuration set part will be assigned to which page is made by the priority given in the header of the configuration set parts 55. The controller assigns the configuration set parts to their respective configuration set parts starting with the one with the highest priority. For instance, as shown in FIG. 10B, the menu for the VTR deck, which has a high priority, is displayed on the first page.

Here, navigation information conveyed to the user by an icon showing "next menu" ("next menu" in FIG. 10B and "previous menu" in FIG. 10C) is independently added by the controller.

Thus, when the device displays the menu specified by the function menu 51 on a plurality of pages, navigation information such as a scroll bar or icons for displaying the next page or previous page is produced independently by the controller and displayed on the display screen.

Data objects (still pictures and text data) showing the configuration set parts 55 themselves are used as captions on the display screen of the controller.

The configuration set parts contained information about priority in this embodiment, but the identifiers (such as ID) of the configuration set parts may also be used, and a lower value of an identifier can be treated as a higher priority, allowing the same effect to be obtained.

When the user clicks on the icon indicating "next page" in the operation screen in FIG. 10B, the controller detects this operation with the display/function selection means 14, and displays on the screen the configuration set part (VTR tuner) indicating the next priority, for example. Text data and an icon indicating the "previous menu" are displayed here independently by the controller.

While not depicted, the display parts 52 not belonging to the configuration set parts are displayed on a page after all the configuration set parts.

Out of "rewind," "play," "fast forward," "pause," "stop," and "record" belonging to the configuration set parts 55 shown in FIG. 10B, the functions other than "stop," which does not handle stream data, use channel information (CH 5).

In FIG. 10C, the display parts 52 indicated by "channel up" and "channel down" use CH 6.

Here, when the controller displays stream data, it may be displayed along with the configuration set parts 55 that produce the device, or only the stream data may be displayed and the configuration set parts 55 displayed once again by operation of the remote control 22 on the part of the user.

The configuration set parts 55 can also be used hierarchically, and there may be separate configuration set parts 55 among the configuration set parts 55. In this case it is possible to partition the display parts 52 more finely, allowing for even more flexibility in the screen size of the controller.

Figure 19:
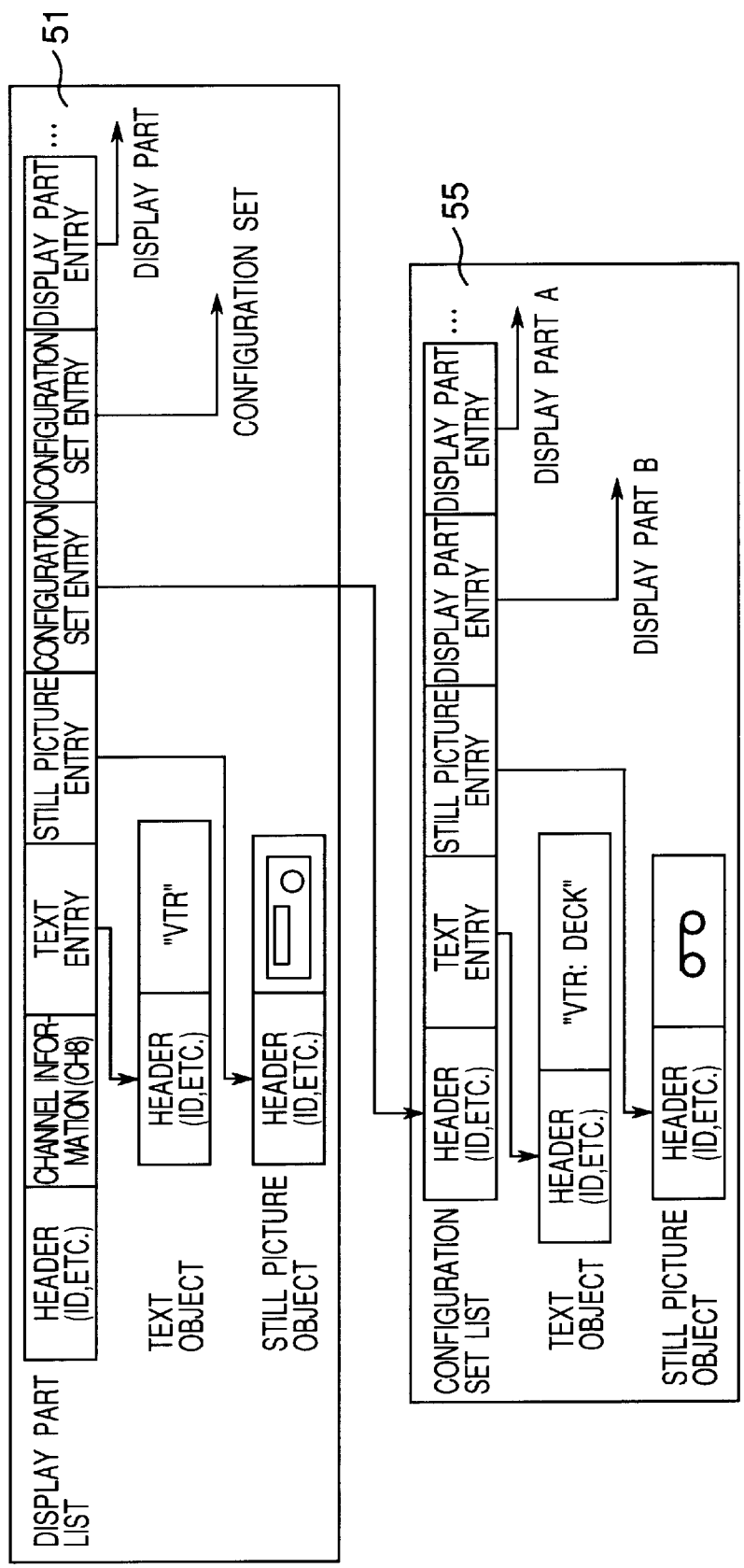
FIG. 19 is a structural diagram of the function menu and configuration set parts in the seventh embodiment.

Also, as shown in FIG. 19, the menus (function menus) that show the functions of the device may contain channel information, in which case, of the display parts 52 belonging to the function menu 51, channel information (CH 8) is used for those functions that transmit stream data using a channel on the transmission line 1. Thus, the flow of stream data can be controlled easily in device units, and the user can be easily provided with functions that bridge devices.

As discussed above, with the present invention, a device has a plurality of display parts that make up the operation screen of this device, and configuration set parts that indicate a set consisting of a number of the above-mentioned display parts and that contain channel information indicating the channel of the transmission line, and a controller reads these display parts and configuration set parts from this device and sets the channel of the transmission line according to the channel information in the handling of data shown by a display part belonging to a configuration set part, and as a result, the channel of the transmission line can be set in the various function units among the devices shown by the configuration set parts, it is possible to control the flow of stream data in the various function units with respect to a device having a plurality of function units, and simultaneous use in function units is also possible. Also, if the display parts are displayed on the display screen according to the information of a configuration set part having channel information, then even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by dividing the display into a plurality of pages according to the configuration set part information, and stream data can be handled independently for each individual page.

If the device has menus which consist of a plurality of display parts showing the operation screen of the device and which contain channel information showing the channels of the transmission line, and if the controller reads the menus and display parts from the device and sets the channel of the transmission line according to the channel information in the handling of the data shown by the above-mentioned display parts belonging to the menus, then the channels of the transmission line can be easily set in device units, and it will be possible to handle stream data with ease.

If configuration set parts or menus have flags indicating the type of stream, then stream data that cannot be handled by the controller can be detected before the controller displays, and it is possible to notify the user that the function shown by this display part 52 cannot be used with this controller, which means that an operation screen which is easier to use can be provided.

Eighth Embodiment: Content display

The eighth embodiment will be described using FIGS. 20 to 23. Here, content flags were provided for display parts such as icons whose attributes included video (content) that was displayed upon receipt of a broadcast or the like, and only the display parts including content could be gathered.

The eighth embodiment of the present invention will now be described through reference to the figures.

Figure 20:
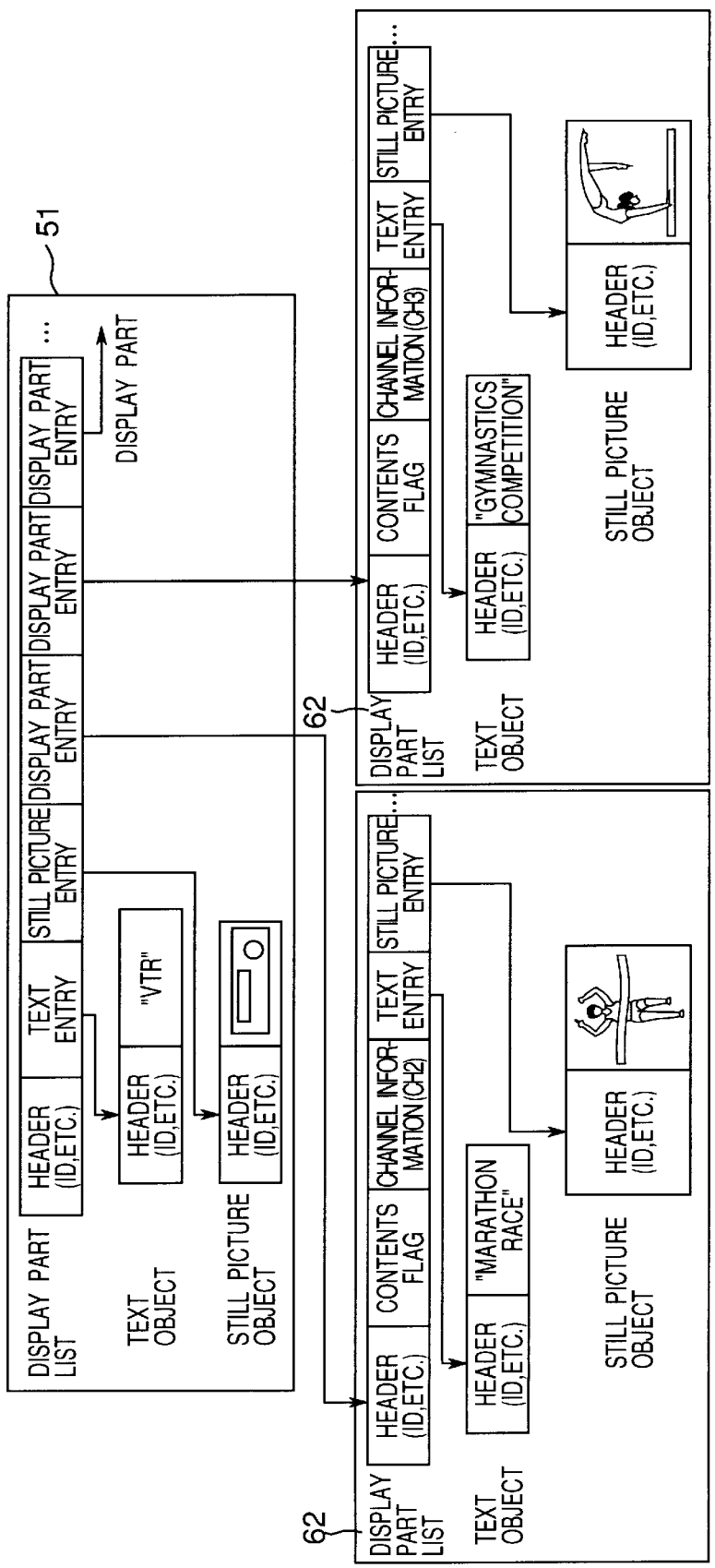
FIG. 20 is a structural diagram illustrating the function menu and configuration set parts in the eighth embodiment.
Figure 21:
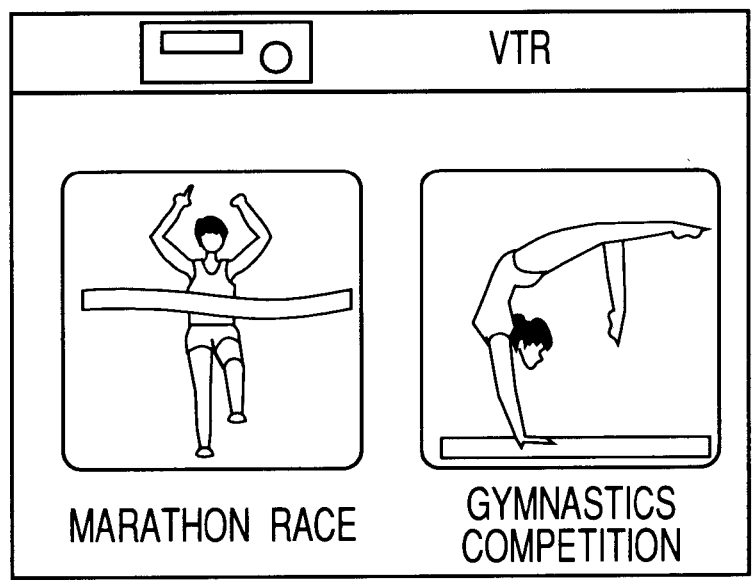
FIG. 21 is an explanatory diagram of a normal screen display in the eighth embodiment.

FIG. 20 is a structural diagram illustrating the function menu and configuration set parts in the eighth embodiment. Everything but the content display parts here is the same as in the first embodiment, and therefore will not be described.

In FIG. 20, the various content display parts 62 in these function information tables 8 (not shown) have channel information on the transmission line 1. Furthermore, the various content display parts 62 have content flags showing information about the content in the device. There may be flags in the header showing that these are the content display parts 62, or these may be distinguished from other display parts and so forth by identifiers (ID's) or the like. The other constituent elements are the same as with the display parts 52. For example, as shown in FIG. 20, a still picture object having an entry in the content display parts 62 of this device (VTR) was produced from a single still picture extracted from the playback picture of the device.

First, when this device is connected to the transmission line 1, the controller on this transmission line 1 recognizes a new device by bus resetting, in the case of a 1394 bus, for instance, and reads the device information parts 50 of the function information tables 8 through the transmission line 1 from the new device as directed by the function information table management means 12, so that these device information parts 50 of the function information tables 8 are read and registered in the function data base 13 of the controller. Next, the function menu 51 and the content display parts 62 are read by the same method as that discussed in the first embodiment.

The function information tables 8 here are the ones shown in FIG. 14, and the function menu 51 and the content display parts 62 are the ones shown in FIG. 20. These content display parts 62 have data objects showing the various functions (in FIG. 20, text data and still picture data for "marathon race" and "gymnastics competition"), control codes (in FIG. 20, the ID's of the various content display parts), and so forth. Content display parts using a channel on the transmission line 1, such as the content display parts 62, have channel information sent by the device as stream data when this function is selected. For instance, a channel performs broadcast out with IEEE 1394 AV protocol. This channel information also determines which channel the unit internal control means 9 in the device will reserve for sending stream data, and is given in the various content display parts 62 of the function information tables 8 in the device. (The "marathon race" is on channel 2, and the "gymnastics competition on channel 3.)

The various parts in the function information tables 8 do not necessarily need to physically contain the links shown in FIG. 14 (association of entries and entities), as long as they can be accessed from the controller in object units by identifiers (ID's) or the like.

The display/function selection means 14 refers to the function information tables 8 (or some of the function information tables 8) in the function data base 13 through the function information table management means 12.

If the display/function selection means 14 displays a list of the devices connected to this controller, then the display/function selection means 14 uses the function information table management means 12 to read the data objects (such as text objects and still picture objects) in the device information parts 50 from the function information tables 8 of all of the devices registered in the function data base 13, and displays these are on the screen.

Next, when the user selects a still picture object of a device by means of the pointing function (such as the directional key) of a remote control, the display/function selection means 14 uses the function information table management means 12 to read the content display parts 62 of the various functions given in the function menu list from the function information table 8 of this device, and displays the content display parts 62 corresponding to the various functions on the screen. This makes it possible to display on the screen the content display parts 62 showing all of the functions of this device. Here, the function menu 51 shown in FIG. 20 is displayed as in FIG. 21, for example.

Next, when the user selects a content display part 62 showing, for example, the play function of the device (the still picture showing "marathon race") by means of the pointing function of a remote control or the like, the display/function selection means 14 sends the ID of this content display part 62 attached by the device as a control code to the device.

The configuration may also be such that the operation information of the user is sent to the device along with the control code, as in embodiment 1.

The device receives the control code (ID) of the content display part 62 selected on the controller, the meaning of the received data is interpreted by the device asynchronous data processing means 6, it is determined that the "marathon race" of the VTR is to be played, and a play directive is issued to the unit internal control means 9. At this point the unit internal control means 9 reserves the band of the transmission line 1 required for VTR playback, and acquires a channel as a predetermined value. The unit internal control means 9 searches for the program titled "marathon race" recorded by the VTR, goes to the beginning of the program, and starts playing, and stream data is outputted to a channel (CH 2) on the transmission line 1.

The controller waits for a response from the device with respect to the control code sent to the device, and after the proper response has been returned, sets the channel of the transmission line 1 given in the channel information (CH 2) to receive, reads the packet flowing through channel 2 of the transmission line 1, and performs processing such as decoding with the controller signal processing means 10, after which the display/function selection means 14 displays the image on the display screen.

In this case, if the device wants to change a content display part 62, such as inverting the color of the still picture of the "marathon race," for example, in order to show that the "marathon race" is being played, then the device sends the content display part 62 to be changed (including text objects and still picture objects) to the controller. Thus, the controller learns that the content display part 62 of this ID has been changed, and overwrites the corresponding content display part 62.

Here, if the device wants to change a content display part, the ID of the content display part 62 may be sent to the controller, in which case the controller uses this ID to retrieve this content display part 62 from the device, and overwrites the corresponding content display part 62. The ID, or the ID and data, may also be sent to the controller in data object units rather than content display part units.

If, for some reason, the device is unable to receive a control code sent by the controller, the display/function selection means 14 detects that the device did not receive the control code based on its response to the transmitted control code or the like, and a content display part 62 independently had by the controller is displayed (displayed in a large size in a conspicuous location such as the center of the screen, for example), thereby notifying the user that control failed.

When content playback is to be ended, the controller sends the device the control code (ID) of the content display part 62 showing the content along with information showing the end of playback. The device receives the control code and this information showing the end of playback, ends the playback of the content, and releases the channel and band of the transmission line 1 that had been reserved.

The controller received the stream flowing through the corresponding channel of the transmission line 1 in this embodiment, but it is also possible for the controller to direct another device or controller to receive the stream data flowing through the corresponding channel, which makes it easy to direct that the stream data flowing through the corresponding channel be received, allows the controller to control the flow of the stream easily and freely in function units, and allows more functions to be provided to the user.

Also, the stream data flowing through the corresponding channel of the transmission line 1 was video/audio data here, but may instead be just video or just audio data, or other data (character data or print data used with a printer), and in more specific terms, may be MPEG or DV data, and as long as the function shown by a display part 52 transfers data over the transmission line 1, any such data may be used as stream data.

Furthermore, if the display parts 52 have flags indicating the type of this stream data, stream data that cannot be handled by the controller can be detected before the controller displays this display part on the screen, and it is possible to notify the user that the function shown by this display part 52 cannot be used with this controller, which means that an operation screen which is easier to use can be provided.

The device determined the channel information ahead of time in this embodiment, but after the device has received a control code from the controller, a band and channel may be reserved on the transmission line 1, and this channel information sent to the controller. For example, the configuration may be such that when the user presses a still picture given as a content display part 62 having channel information showing that one of the channels on the transmission line 1 is being used (that is, information showing that a channel has been determined after selection of this unit), the device receives the control code of this still picture, and sends the controller a content display part 62 including channel information acquired by the device after receipt of a control code and a still picture showing that this play button has been pressed (such as one in which the color of the still picture has been inverted).

Another possibility is for channel information scheduled for use by the device to be provided to the content display part 62, and after the control code of this content display part 62 has been received by the device from the controller, the device reserves the band and channel, and the specified channel information is sent to the controller as a response to the control code.

The configuration may also be such that the channel information is rewritable, the device reserves a band and channel when another controller is used the device, for example, the channel information of the corresponding content display part 62 in the function information table 8 is updated as needed, and the controller is notified that this content display part has been changed. In this case, a change in the status of the device by another controller (such as the acquired channel of the device) can be easily accommodated by displaying the output stream of the device.

With a disk apparatus such as a DVD, if every content display part 62 has channel information, then the controller will be able to execute and direct a plurality of functions simultaneously, and it will be possible to display a plurality of streams simultaneously on the screen of the controller (watching two contents at the same time), to watch one program while recording a background program, and so on. Also, when another controller is controlling the device in question, it is possible for the controller to receive and display on the screen the channel on the transmission line 1 given in the channel information, allowing the user to be notified of the status of a unit being used by another controller through video/audio played on the display screen or the like, and allowing an operation screen that is easier for the user to understand to be constructed.

The still pictures showing the content in the device were produced from playback images of the device in this embodiment, but with an STB or the like, it is also possible for the configuration to be such that the still pictures showing the content from the broadcast are retrieved from information such as EPG, or, with a recording device such as a VTR or a DVD-RAM, to produce still pictures showing the content during recording and store them as index information in a storage medium or the device, or, in the case of a non-recordable device such as a DVD-ROM, to store these still pictures as index information in a storage medium ahead of time.

Only the functions showing the content in the device were described in this embodiment, but it is also possible to provide flags showing content information in the header of the content display parts 62 for functions showing content, which distinguishes these functions from operation functions of the device such as "play," and to have both types of function present in a single function menu 51 or configuration set part 55, thereby making the various functions more understandable to the user.

Furthermore, the control codes (ID's) of the content display parts 62 showing the content were used in ending the playback of content in this embodiment, but the content display parts may have separate control codes indicating the end of content playback. Also, the ending of content playback and the release of the band and channel of the transmission line 1 may be divided, and control codes indicating each may be added to the content display part 62 apart from the ID's. The configuration may also be such that the control codes (ID's) of the content display parts 62 showing the content and information showing the end of playback, or the control codes (ID's) and information showing the release of the band and channel, are transmitted to the device.

Figure 22:
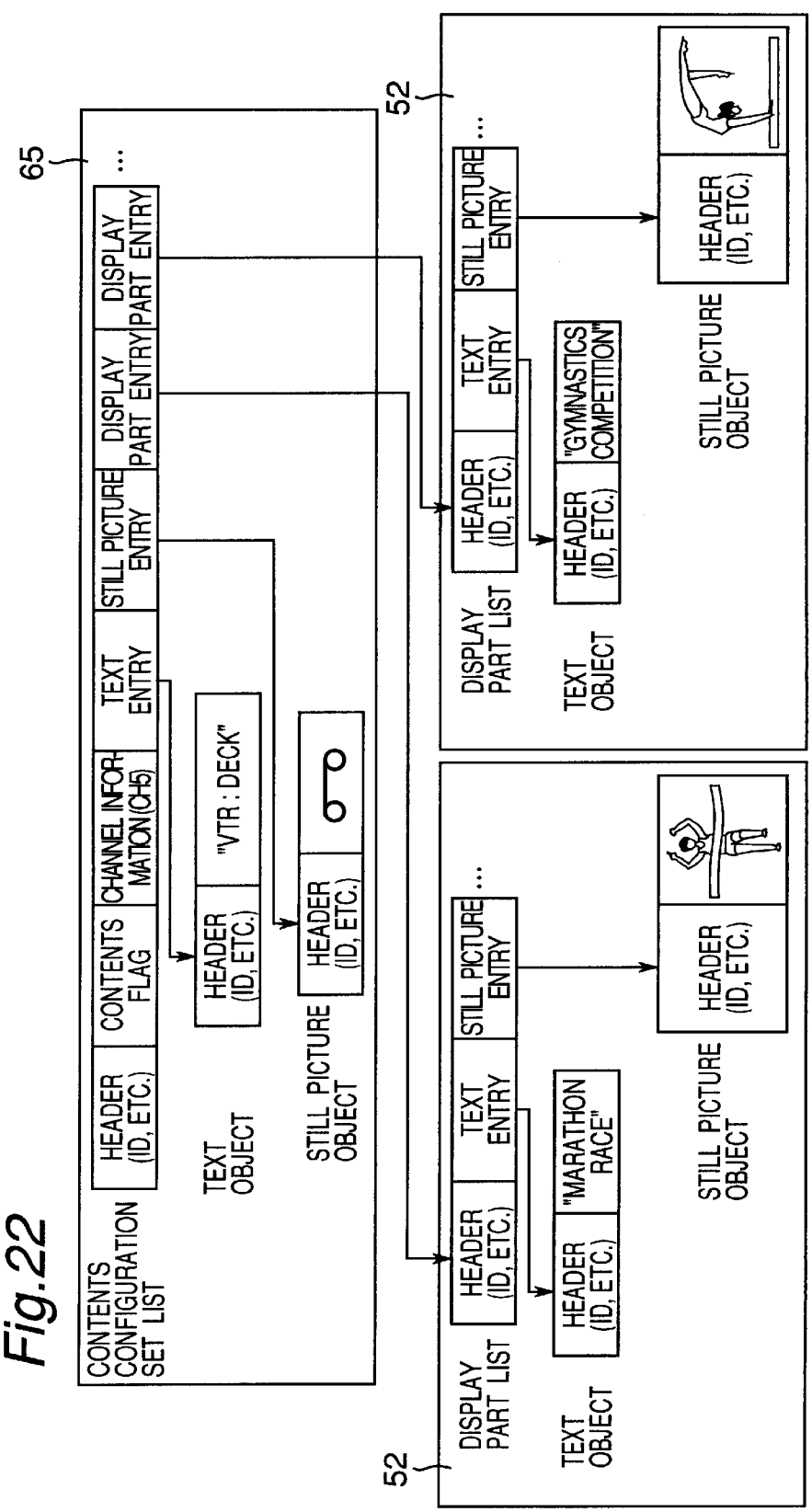
FIG. 22 is a structural diagram of the configuration set parts and display parts in the eighth embodiment.

Also, as shown in FIG. 22, the channel information may be contained by content configuration set parts 65 showing sets of display parts 52 that do not have content flags but show the contents of the devices, in which case, channel information (CH 5) is used for the functions transmitting stream data ("marathon race" and "gymnastics competition") using a channel on the transmission line 1 out of the display parts 52 belonging to the content configuration set part 65.

Here, the content configuration set part 65 has content flags showing that display parts 52 showing content information are included in this content configuration set part 65. Differentiation from other display parts and the like may be achieved with identifiers (ID's) or the like, or by having flags indicating the content configuration set part 65 in the header.

The display parts 52 here do not have flags showing content information, but make the user recognize that content information is being shown, by data objects such as still pictures.

As to the reading of the content configuration set parts 65, it is the same as for the configuration set parts 55 in the seventh embodiment, and will therefore not be described.

The configuration set parts 55 have information showing the end of playback of the content of the display parts 52, and when the content playback of the display parts 52 belonging to the configuration set parts 55 is ended, the information showing this ending of content playback is sent to the device.

Thus, it is possible for the device to specify the channel of the transmission line 1 in the function units of the device, allowing suitable channel information to be shared by the device and controller with a smaller quantity of information, and allowing the controller to control the flow of a stream easily and freely in function units.

The ending of content playback and the release of the band and channel of the transmission line 1 may be divided, and information indicating each may be added as control codes to the configuration set parts 55 apart from the ID's.

There may be content display parts 62 in the configuration set parts 55, in which case the channel number of the content display parts 62 will take priority over these content display parts 62 when the content display parts 62 have a channel number.

Figure 23:
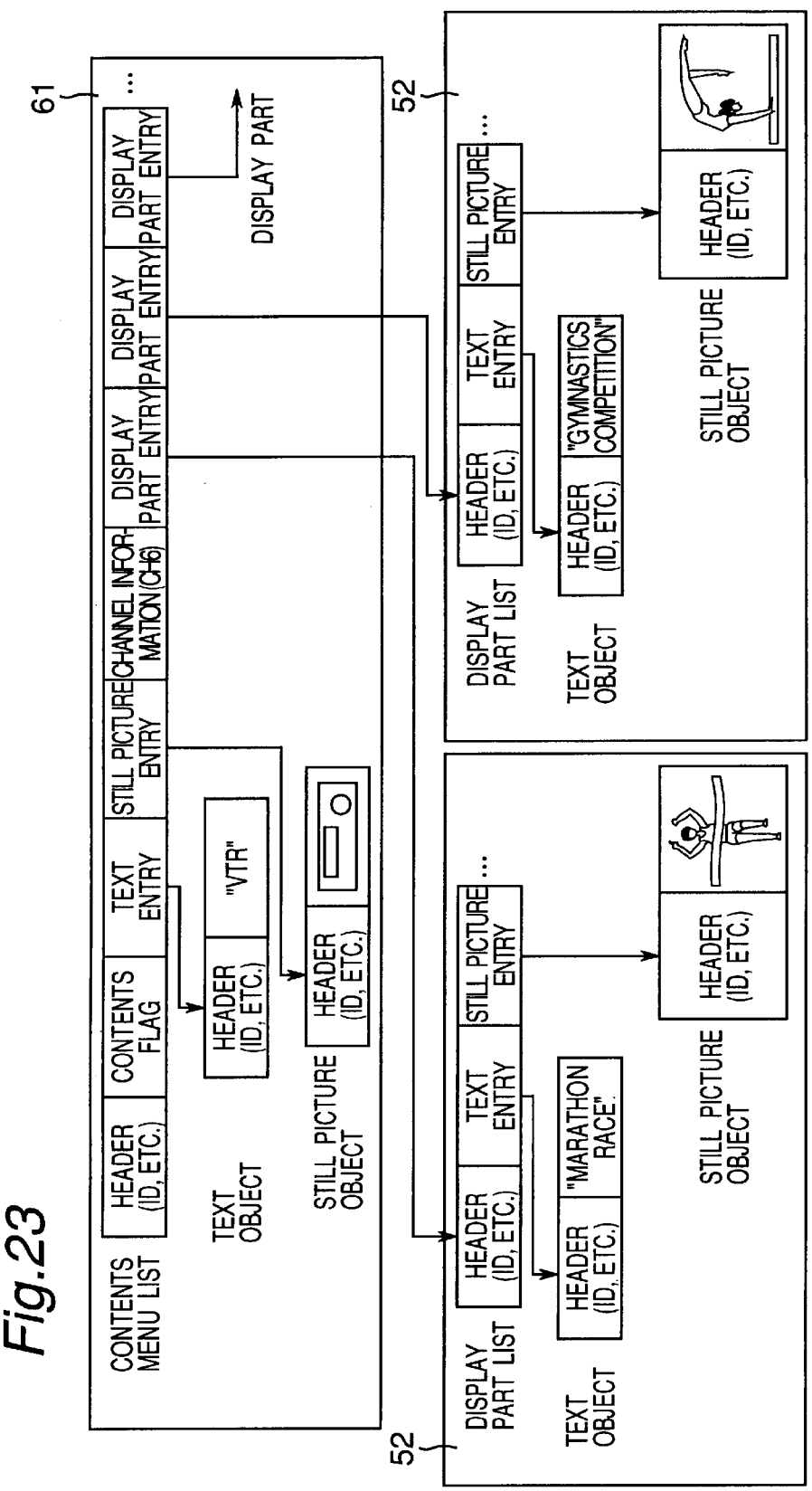
FIG. 23 is a structural diagram of the function menu and display parts in the eighth embodiment.

As shown in FIG. 23, a menu showing the content of a device (content menu) may contain channel information, in which case channel information (CH 8) is used for the functions transmitting stream data using a channel on the transmission line 1 out of the display parts 52 belonging to the content menu 61. Here, the display parts 52 belonging to the content menu 61 have no flags indicating that they are content information, but show the content in the device. Furthermore, these display parts 52 make the user recognize that content information is being shown, by data objects such as still pictures.

The content menu 61 here has content flags showing that display parts 52 showing content information are included in this content menu 61. Differentiation from other display parts and the like may be achieved with identifiers (ID's) or the like, or by having flags indicating the content menu 61 in the header.

The content menu 61 has information showing the end of playback of the content of the content display parts 62, and when the content playback of the display parts 52 belonging to the content menu 61 is ended, the information showing this ending of content playback is sent to the device.

Thus, it is possible for the device to specify the channel of the transmission line 1 in the function units of the device, allowing enough required channel information to be shared by the device and controller.

The ending of content playback and the release of the band and channel of the transmission line 1 may be divided, and information indicating each may be added as control codes to the content menu 61 apart from the ID's.

Furthermore, there may be content display parts 62 in the content menu 61, in which case the channel number of the content display parts 62 will take priority over these content display parts 62 when the content display parts 62 have a channel number.

As discussed above, with this embodiment, the device has content display parts that make up the operation screen of the device, show the content handled by the device, and contain control codes specifying content, while the controller reads the content display parts from the device and displays the content display parts on the display screen, so when the user operates a content display part on the display screen, the controller uses the control code to direct the transmission and receipt of the content to and from this device, which makes it possible to notify the user of the content of the device and allows an operating environment that is easier to understand to be provided.

If the content display parts have channel information showing the channel of the transmission line over which the contents showing the content display parts are transmitted and received, then it will be possible for the controller to handle with ease the stream data of content shown by the content display parts, it will be possible to display the content on the screen of the controller with a simple configuration, and it will be possible to direct the transmission of stream data to other devices. It will further be possible for a plurality of contents to be handled simultaneously according to the capability of the device.

The device has content display parts that make up the operation screen of the device, show the content handled by the device, and contain control codes specifying content, and content configuration set parts that show a set composed of a plurality of content display parts, while the controller reads the content display parts and content configuration set parts from the device and displays the content display parts on the display screen according to the information shown by the content configuration set parts, so when the user operates a content display part on the display screen, the controller uses the control code to direct the transmission and receipt of the content to and from this device, which allows for the simple classification of contents for which the device is able to send stream data simultaneously, and the user can be easily made to recognize contents which cannot be selected simultaneously.

The device has content display parts that make up the operation screen of the device, show the content handled by the device, and contain control codes specifying content, and a content menu that is composed of one or more content display parts and shows the functions of the device, while the controller reads the content menu and the content display parts from the device and displays the content menu on the display screen, so when the user operates a content display part on the display screen, the controller uses the control code to direct the transmission and receipt of the content to and from this device, which allows the contents handled by the device to be displayed simply and clearly on the operation screen of the controller, and makes it possible for the contents shown by these content display parts to be played back with ease, merely by selecting a content display part.

The content display parts, the content configuration set parts, or the content menus have flags showing the type of stream, which makes it possible for stream data that cannot be handled by the controller to be detected before the controller displays anything on the screen, and it is possible to notify the user that the function shown by this display part 52 cannot be used with this controller, which means that an operation screen which is easier to use can be provided.

Effect of the Invention

A device has a plurality of display parts that constitute the operation screen of the device, these display parts contain layout information indicating the layout relationship to be assumed with other display parts, the controller reads the display parts from the device, and the display parts are displayed on the display screen according to the layout information, which means that even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

If the layout information is relationship information having the same information for a plurality of display parts to be laid out in proximity, then even when a plurality of display groups are present in a single menu, or when there are numerous display parts belonging to a display group to be laid out in proximity, and even when a plurality of display parts make up a plurality of groups, the layout information can be described simply with appended information of small data quantity, and even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

If a single display part has a plurality of sets of layout information, then the layout information can be described simply even when there are a plurality of display parts to be laid out in proximity with respect to a single display part. Even when only a display screen that is smaller than the screen size the device is supposed to have can be used with the controller, and the menu of the device cannot be displayed completely due to limitations such as the resolution of the screen or the effect of other display categories, closely related display parts can still be displayed in proximity and always within a single screen and an operation screen that is easy for the user to understand and operate can still be provided by displaying a single display part a plurality of times in the division and display of the display parts on a plurality of pages according to the layout information.

If the layout information is identifiers of display parts to be laid out in proximity, then it is easier to define the layout information, the controller can directly detect display parts to be laid out in proximity, it is possible for display parts that are to be laid out in proximity to be displayed on the display screen more simply, and even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by rearranging the display parts according to the layout information or by dividing the display into a plurality of pages.

If the display parts have identifiers of display parts to be laid out in proximity in the up, down, left, and right directions, then the device can specify the display method more precisely, and the intent of the person who created the device menu can be conveyed easily to the user even when the controller only has a display screen that is smaller than the screen size the device is supposed to have.

If a device has a plurality of display parts that make up the operation screen of this device, and configuration set parts that indicate a set consisting of a number of the display parts and that have information indicating the priority of the display, and if a controller reads these display parts and configuration set parts from this device and displays the display parts on a display screen according to the information of the configuration set parts, then even when only a display screen that is smaller than the screen size the device is supposed to have can be used with the controller, and the menu of the device cannot be displayed completely due to limitations such as the resolution of the screen or the effect of other display categories, it is possible for the controller to display the information on the screen in the order of its importance to the user, the result of which is a display screen that is easier to view. Furthermore, the menu producer is able to create an optimal design for a given screen size more freely, and is also able to include in the design such considerations as how the individual screens appear for different screen sizes, and particularly the division of the pages and the relationship between the preceding and succeeding pages.

If a device has a plurality of display parts that make up the operation screen of this device, and configuration set parts that indicate a set consisting of a number of the display parts, and if a controller reads the display parts and set information from the device and displays the display parts on the display screen according to the information of the configuration set parts, then even when only a display screen that is smaller than the screen size the device is supposed to have can be used with the controller, and the menu of the device cannot be displayed completely, an operation screen that is easy for the user to understand can still be provided by dividing the display into a plurality of pages according to the information of the configuration set parts.

Furthermore, the producer of the device menu can assume a plurality of screen sizes in producing the menu, and the intent of the menu producer can be conveyed to the user even for controllers of different screen sizes. Also, the controller is able to handle the display parts and display them on the screen in configuration set part units, which simplifies processing.

If the configuration set parts have a hierarchical structure, then the menu producer will be able to assume more screen sizes in the production of the device menus, and the controller can display variously suitable menu screens for more screen sizes.

If the device has a menu consisting of a plurality of display parts showing the operation screens of this device, the controller reads these display parts from this device, and when the size of this menu is larger than the display screen of the controller, the controller divides the display into a plurality of pages the same size or smaller than the display screen, and produces information about navigation between these plurality of pages and displays this information on the display screen, then even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by dividing the display into a plurality of pages. Furthermore, controllers of a variety of display screen sizes can be easily accommodated by virtue of the controller having the initiative in regard to the production of information about navigation between these plurality of pages.

If device has display parts having operation information for changing the display of the operation screen by operation from the user, and a menu consisting of a plurality of display parts showing the operation screen, and if the controller reads these display parts and configuration set parts from this device and displays the menu of the device on the display screen, and the display of the display screen is changed by operation from the user according to the operation information, then the menu producer can assume operation by the user in the production of the menu, so an operation screen that is easy to understand can be provided to the user, and since there is no need to read the information of the display screen from the device every time the user performs an operation, the display screen can be changed more quickly. Furthermore, when only a display screen that is smaller than the screen size the device is supposed to have can be used with the controller, even if the positions of the various display parts have been rearranged by the controller, the user can be simply and clearly apprised of the provision of the various functions and menus by defining the movement of the cursor with operation information, so an operation screen that is easy to operate can be provided.

Furthermore, using identifiers showing other display parts for the operation information makes it simple to define the movement of the cursor, and allows the provision of the various functions shown by the display parts to be presented in a straightforward manner to the user, so the user is able to learn of the relationship between the functions intuitively, and since there is no need to ask the device about cursor movement, operation is easier.

Also, if the menus have configuration set parts, and the operation information is identifiers indicating configuration set parts, then the user can be easily apprised of the association between the various configuration set parts, allowing the provision of an operation screen that is easier to use.

If the device has a plurality of menus, and if display parts having as operation information identifiers indicating other menus are provided within the menus, then menus can be switched with ease, even though there is no button for menu switching or the like on the remote control, etc.

Furthermore, if the device has a help menu giving explanations of the functions shown by the various devices, and if the display parts have as operation information identifiers indicating the help menu, then an operation screen that can display explanations of the various functions and menus with ease and that is easier to use can be provided to the user.

Effect of the Invention

If a device has display parts which make up the operation screen of the device and contain channel information that shows the channel of the transmission line, and if the controller reads the display parts from the device and sets the channel of the transmission line according to the channel information when handling data shown by the display parts, then it is possible to share channel information between the controller and the device with a simple configuration, allowing the controller to control the flow of stream data with ease. Also, a plurality of data streams can be executed simultaneously if there is channel information for every display part with a device that can handle a plurality of data streams simultaneously.

If a device has a plurality of display parts that make up the operation screen of this device, and configuration set parts that indicate a set consisting of a number of the display parts and that contain channel information indicating the channel of the transmission line, and if a controller reads these display parts and configuration set parts from this device and sets the channel of the transmission line according to the channel information in the handling of data shown by a display part belonging to a configuration set part, then the channel of the transmission line can be set in the various function units among the devices shown by the configuration set parts, it will be possible to control the flow of stream data in the various function units with respect to a device having a plurality of function units, and simultaneous use in function units will also be possible. Also, if the display parts are displayed on the display screen according to the information of a configuration set part having channel information, then even when only a display screen that is smaller than the screen size the device is supposed to have can be used with the controller, and the menu of the device cannot be displayed completely due to limitations such as the resolution of the screen or the effect of other display categories, an operation screen that is easy for the user to understand can still be provided by dividing the display into a plurality of pages according to the configuration set part information, and stream data can be handled independently for each individual page.

If the device has menus which consist of a plurality of display parts showing the operation screen of the device and which contain channel information showing the channels of the transmission line, and if the controller reads the menus and display parts from the device and sets the channel of the transmission line according to the channel information in the handling of the data shown by the display parts belonging to the menus, then the channels of the transmission line can be easily set in device units, and it will be possible to handle stream data with ease.

If display parts, configuration set parts, and menus have flags indicating the type of stream, then stream data that cannot be handled by the controller can be detected before the controller displays, and it is possible to notify the user that the function shown by this display part cannot be used with this controller, which means that an operation screen which is easier to use can be provided.

If a device has content display parts that make up the operation screen of the device, show the content handled by the device, and contain control codes specifying content, and if the controller reads the content display parts from the device and displays the content display parts on the display screen, so that when the user operates a content display part on the display screen, the controller uses the control code to direct the transmission and receipt of the content to and from this device, then it will be possible to notify the user of the content of the device and will allow an operating environment that is easier to understand to be provided.

If a device has content display parts that make up the operation screen of the device, show the content handled by the device, and contain control codes specifying content, and if the controller reads the content display parts and from the device and displays the content display parts on the display screen, so that when the user operates a content display part on the display screen, the controller uses the control code to direct the transmission and receipt of the content to and from this device, then it will be possible to notify the user of the contents of the device, and an operating environment that is easier to understand can be provided.

If the content display parts have channel information showing the channel of the transmission line over which the contents showing the content display parts are transmitted and received, then it will be possible for the controller to handle with ease the stream data of content shown by the content display parts, it will be possible to display the content on the screen of the controller with a simple configuration, and it will be possible to direct the transmission of stream data to other devices. It will further be possible for a plurality of contents to be handled simultaneously according to the capability of the device.

If a device has content display parts that make up the operation screen of the device, show the content handled by the device, and contain control codes specifying content, and content configuration set parts that show a set composed of a plurality of content display parts, and if the controller reads the content display parts and content configuration set parts from the device and displays the content display parts on the display screen according to the information shown by the content configuration set parts, so that when the user operates a content display part on the display screen, the controller uses the control code to direct the transmission and receipt of the content to and from this device, then the contents for which the device is able to send stream data simultaneously can be classified with ease, and the user can be easily made to recognize contents which cannot be selected simultaneously.

If a device has content display parts that make up the operation screen of the device, show the content handled by the device, and contain control codes specifying content, and a content menu that is composed of one or more content display parts and shows the functions of the device, and if the controller reads the content menu and the content display parts from the device and displays the content menu on the display screen, so that when the user operates a content display part on the display screen, the controller uses the control code to direct the transmission and receipt of the content to and from this device, then the contents handled by the device can be displayed simply and clearly on the operation screen of the controller, and it will be possible for the contents shown by these content display parts to be played back with ease, merely by selecting a content display part.

If the content display parts, the content configuration set parts, or the content menus have flags showing the type of stream, then it will be possible for stream data that cannot be handled by the controller to be detected before the controller displays anything on the screen, and it will be possible to notify the user that the function shown by this display part cannot be used with this controller, which means that an operation screen which is easier to use can be provided.

If a device has display parts that make up the operation screen of the device, and menus composed of one or more display parts and showing the functions of the device, and if, when the controller requests a usage right for a device and the device grants this usage right, the device sends the controller a menu list including identifiers for the display parts that make up the above-mentioned menus of the device, then the controller can acquire the menus in the device by a simple procedure, the number of display parts in a menu list and so on can be confirmed even when there is little memory space in the controller, it will be possible to read just what is needed, and the menus of the device can be displayed more efficiently.

When there is a change in the display parts in a device after the controller has requested the usage right for that device, the device can easily ascertain the controller having the usage right by sending the above-mentioned changed display parts to the controller, making it possible for a notification of a change in the display parts in a device to be made efficiently when there is such a change. When the controller relinquishes its usage right to the device, the controller notifies the device that the usage right has been relinquished, and the channel of the transmission line that was in use at the directive of this controller is released by the device, which prevents the device from remaining in a state in which the channel of the transmission line is in use, and allows the transmission line to be utilized more effectively.

What is claimed is:

1. An audio/video network control system comprising:
   a controller operable to handle one or more sets of data pertaining to video, audio, or information and comprising a user interface; and
   a device operable to handle one or more sets of data pertaining to video, audio, or information, said device having means for holding a plurality of display parts that constitute an operation screen for said device, said device being connected to said controller via a transmission line,
   wherein at least one of said display parts has layout information showing a layout relationship to be assumed with the other display parts,
   wherein the layout information comprises identifiers of display parts to be laid out in proximity,
   wherein said controller further comprises means for reading said display parts from said device, and
   wherein said parts are operable to be displayed on a display screen according to the layout information.

2. The network control system according to claim 1, wherein the layout information is relationship information having the same information for a plurality of display parts to be laid out in proximity.

3. The network control system according to claim 1, wherein said display parts have identifiers for displaying display parts to be laid out in proximity in up, down, left, and right directions.

4. The network control system according to claim 2, wherein one display part has a plurality of sets of layout information.

5. The network control system according to claim 1, wherein one display part has a plurality of sets of layout information.

6. A device for use in an audio/video network control system including a display screen and a controller unit operable to handle one or more sets of data pertaining to video, audio, or information and having a user interface, said device comprising:
   means for holding a plurality of display parts that constitute an operation screen,
   wherein said device is operable to handle one or more sets of data pertaining to video, audio, or information,
   wherein said device is operable to be connected to the controller unit via a transmission line,
   wherein at least one display part has layout information showing a layout relationship to be assumed with the other display parts, and
   wherein the layout information comprises identifiers of the display parts to be laid out in proximity.

7. A controller for use in an audio/video network control system including a display screen and a device unit operable to handle one or more sets of data pertaining to video, audio, or information, said controller comprising:
   a user interface;
   means for reading, from the device via a transmission line, display parts that constitute an operation screen for the device and layout information showing the layout relationship that the display parts should have with the other display parts,
   wherein said controller is operable to instruct the display screen to display the display parts according to the layout information, and
   wherein the layout information comprises identifiers of the display parts to be laid out in proximity.

8. An audio/video network control system comprising:
   a controller operable to handle one or more sets of data pertaining to video, audio, or information and comprising a user interface; and
   a device operable to handle one or more sets of data pertaining to video, audio, or information, said device having means for holding a plurality of display parts that constitute an operation screen for said device, said device unit being connected to said controller via a transmission line,
   wherein said device further includes set information based on a number of display parts, from among said display parts, operable to be displayed on a display screen as a set,
   wherein said device further includes configuration set parts having information showing a priority order of display,
   wherein said controller unit is operable to read said display parts and the set information from said device, wherein said display parts are operable to be displayed on a display screen according to information about the configuration set parts, wherein at least one of said display parts has layout information showing a layout relationship to be assumed with the other display parts, and wherein the layout information comprises identifiers of the display parts to be laid out in proximity.

9. The network control system according to claim 8, wherein said controller unit is operable to display each page of an operation screen in units of information about each configuration set part.

10. The network control system according to claim 8, wherein the configuration set parts have a hierarchical structure.

11. A device for use in an audio/video network control system including a display screen and a controller unit operable to handle one or more sets of data pertaining to video, audio, or information and having a user interface, said device comprising:

a plurality of display parts that constitute an operation screen for said device;

configuration set parts showing a set consisting of a number of display parts from among said display parts;

wherein at least one of said display parts has layout information showing a layout relationship to be assumed with the other display parts, and layout information comprising identifiers of the display parts to be laid out in proximity.

12. A controller for use in an audio/video network control system including a display screen and a device unit operable to handle one or more sets of data pertaining to video, audio, or information, said controller comprising:

a user interface; and means for reading, from the device via a transmission line, display parts that constitute an operation screen for the device and configuration set parts showing a set consisting of a number of display parts from among the display parts, wherein the display parts are operable to be displayed on a display screen according to information about the configuration set parts, wherein at least one of the display parts has layout information showing a layout relationship to be assumed with the other display parts, and wherein the layout information comprises identifiers of the display parts to be laid out in proximity.

13. An audio/video network control system comprising:

a controller operable to handle one or more sets of data pertaining to video, audio, or information and comprising a user interface; and a device operable to handle one or more sets of data pertaining to video, audio, or information, said device having a menu consisting of a plurality of display parts showing an operation screen for said device, said device being connected to said controller via a transmission line, wherein said controller unit further comprises means for reading said display parts from said device, wherein when said menu is larger than a display screen of said controller unit, a display of said controller is divided into a plurality of pages the same size as or smaller than the display screen, and said controller produces information about navigation between the plurality of pages and displays this information on the display screen, wherein said display parts being displayed on a display screen according to information about said configuration set parts, wherein at least one of said display parts has layout information showing a layout relationship to be assumed with the other display parts, and wherein the layout information comprises identifiers of the display parts to be laid out in proximity.

14. A controller for use in an audio/video network control system including a display screen and a device unit operable to handle one or more sets of data pertaining to video, audio, or information, said controller comprising:

a user interface; and means for reading, from the device via a transmission line, menus consisting of a plurality of display parts showing an operation screen for the device, wherein when the menu is larger than a display screen of said controller, the display of said controller is divided into a plurality of pages the same size as or smaller than the display screen, and said controller produces information about navigation between the plurality of pages and displaying this information on the display screen, wherein at least one of the display parts has layout information showing a layout relationship to be assumed with the other display parts, and wherein the layout information comprises identifiers of the display parts to be laid out in proximity.

15. An audio/video network control system comprising:

a controller operable to handle one or more sets of data pertaining to video, audio, or information and comprising a user interface; and a device operable to handle one or more sets of data pertaining to video, audio, or information, said device comprising display parts having manipulation information for changing a display of an operation screen through operation by a user and means for holding a menu consisting of a plurality of said display parts showing the operation screen, said device being connected to said controller via a transmission line, wherein said controller further comprises means for reading said display parts from said device, wherein said menu of said devices is displayed on the display screen, wherein the display of said display screen is changed through operation by the user according to said manipulation information, wherein at least one of said display parts has layout information showing a layout relationship to be assumed with the other display parts, and wherein the layout information comprises identifiers of the display parts to be laid out in proximity.

16. The network control system according to claim 15, wherein the manipulation information comprises identifiers showing the other display parts.

17. The network control system according to claim 15, wherein the menu has configuration set parts, and the manipulation information comprises identifiers showing the other display parts.

18. The network control system according to claim 15, wherein the devices have a plurality of menus, and said menus are equipped with display parts having as manipulation information identifiers that show the other menus.

19. The network control system according to claim 15, wherein the devices have help menus that explain the functions exhibited by the various display parts, and said display parts have as manipulation information identifiers that show said help menus.

20. A device for use in an audio/video network control system including a display screen and a controller unit operable to handle one or more sets of data pertaining to video, audio, or information and having a user interface, said device comprising:

means for holding display parts having manipulation information for changing a display of an operation screen through operation by a user; and menus consisting of a plurality of said display parts showing the operation screen for said device, wherein said device is operable to handle one or more sets of data pertaining to video, audio, or information, wherein said device is operable to be connected to the controller unit via a transmission line, wherein at least one of said display parts has layout information showing a layout relationship to be assumed with the other display parts, and wherein the layout information comprises identifiers of said display parts to be laid out in proximity.

21. A controller for use in an audio/video network control system including a display screen and a device unit operable to handle one or more sets of data pertaining to video, audio, or information, said controller comprising:

a user interface; and means for reading, from the device via a transmission line, a display part having manipulation information for changing a display of an operation screen through operation by a user, and a menu consisting of a plurality of the display parts showing an operation screen for the device, wherein the menus of the device are operable to be displayed on a display screen, wherein the display of the display screen is operable to be changed through a operation by the user according to the manipulation information, wherein at least one of the display parts has layout information showing a layout relationship to be assumed with the other display parts, and wherein the layout information comprises identifiers of the display parts to be laid out in proximity.

22. An audio/video network control system comprising:

a controller operable to handle one or more sets of data pertaining to video, audio, or information and comprising a user interface; and a device operable to handle one or more sets of data pertaining to video, audio, or information, said device being connected to said controller via a transmission line, said device having means for holding display parts that hold channel information indicating a channel of the transmission line and that constitute an operation screen for said device, wherein said controller further comprises means for reading said display parts from said device, wherein the channel of said transmission line is set according to said channel information in the handling of the data shown by said display parts, wherein at least one of said display parts has layout information showing a layout relationship to be assumed with the other display parts, and wherein the layout information comprises identifiers of the display parts to be laid out in proximity.

23. The network control system according to claim 22, wherein the display parts, configuration set parts, or menus have flags showing the type of stream.

24. An audio/video network control system comprising:

a controller operable to handle one or more sets of data pertaining to video, audio, or information and comprising a user interface; and a device operable to handle one or more sets of data pertaining to video, audio, or information, said device being connected to said controller via a transmission line, said device having means for holding a plurality of display parts that constitute an operation screen for said device and for holding configuration set parts that have channel information indicating the channel of the transmission line and that show a set consisting of a number of display parts from among said display parts, said device being connected to said controller via a transmission line, wherein said controller having means for reading said configuration set parts and said display parts from said devices, wherein the channel of said transmission line being set according to said channel information in the handling of the data shown by said display parts belonging to said configuration set parts, wherein at least one of said display parts has layout information showing a layout relationship to be assumed with the other display parts, and wherein the layout information comprises identifiers of the display parts to be laid out in proximity.

25. The network control system according to claim 24, wherein the display parts, configuration set parts, or menus have flags showing the type of stream.

26. An audio/video network control system comprising:

a controller operable to handle one or more sets of data pertaining to video, audio, or information and comprising a user interface; and a device operable to handle one or more sets of data pertaining to video, audio, or information, said device being connected to said controller unit via a transmission line, said device having means for holding a plurality of display parts that show an operation screen for said device, and menus listing channel information indicating the channel of the transmission line, wherein said controller further comprises means for reading said display parts and said menus from said device, wherein the channel of said transmission line being set according to said channel information in the handling of the data shown by said display parts belonging to said menus, wherein at least one of said display parts has layout information showing a layout relationship to be assumed with the other display parts, and wherein the layout information comprises identifiers of the display parts to be laid out in proximity.

27. The network control system according to claim 26, wherein the display parts, configuration set parts, or menus have flags showing the type of stream.

28. A device for use in an audio/video network control system including a display screen and a controller unit operable to handle one or more sets of data pertaining to video, audio, or information and having a user interface, said device comprising:

an operation screen for said device; and means for holding display parts that contain channel information, wherein said device is operable to be connected to the controller unit via a transmission line, wherein the channel information indicates the channel of the transmission line, wherein at least one of said display parts has layout information showing a layout relationship to be assumed with the other display parts, and wherein the layout information comprises identifiers of the display parts to be laid out in proximity.

29. A controller for use in an audio/video network control system including a display screen and a device unit operable to handle one or more sets of data pertaining to video, audio, or information, said controller comprising:

a user interface; and means for reading, from the device via a transmission line, display parts that constitute an operation screen for the device and that have channel information indicating the channel of the transmission line, wherein the channel of the transmission line is set according to the channel information in the handling of the data shown by the display parts, wherein at least one of the display parts has layout information showing a layout relationship to be assumed with the other display parts, and wherein the layout information comprises identifiers of the display parts to be laid out in proximity.

30. A device for use in an audio/video network control system including a display screen and a controller unit operable to handle one or more sets of data pertaining to video, audio, or information and having a user interface, said device comprising:

means for holding a plurality of display parts that constitute an operation screen for said device; and configuration set parts that show a set consisting of a number of display parts from among said display parts, wherein said device is operable to handle one or more sets of data pertaining to video, audio, or information, wherein said device is operable to be connected to the controller unit via a transmission line, wherein said configuration set parts have channel information indicating the channel of the transmission line, wherein at least one of said display parts has layout information showing a layout relationship to be assumed with the other display parts, and wherein the layout information comprises identifiers of the display parts to be laid out in proximity.

31. A controller for use in an audio/video network control system including a display screen and a device unit operable to handle one or more sets of data pertaining to video, audio, or information, said controller comprising:

a user interface; and means for reading, from the device via a transmission line, a plurality of display parts that constitute an operation screen for the device, and configuration set parts that show a set consisting of a number of display parts from among the display parts and that have channel information indicating the channel of the transmission line, wherein the channel of the transmission line is set according to the channel information in the handling of the data shown by the display parts belonging to the configuration set parts, wherein at least one of the display parts has layout information showing a layout relationship to be assumed with the other display parts, and wherein the layout information comprises identifiers of the display parts to be laid out in proximity.

32. A device for use in an audio/video network control system including a display screen and a controller unit operable to handle one or more sets of data pertaining to video, audio, or information and having a user interface, said device comprising:

means for holding a plurality of display parts that constitute an operation screen for said device and menus listing channel information, wherein said device is operable to handle one or more sets of data pertaining to video, audio, or information, wherein said device is operable to be connected to the controller unit via a transmission line, wherein the menus listing channel information indicate the channel of the transmission line, wherein at least one of said display parts has layout information showing a layout relationship to be assumed with the other display parts, and wherein the layout information comprises identifiers of the display parts to be laid out in proximity.

33. A controller for use in an audio/video network control system including a display screen and a device unit operable to handle one or more sets of data pertaining to video, audio, or information, said controller comprising:

a user interface; and means for reading, from the device via a transmission line, a plurality of display parts showing an operation screen for the device, and menus listing channel information indicating the channel of the transmission line, wherein the channel of the transmission line is set according to the channel information in the handling of the data shown by the display parts belonging to the menus, wherein at least one of the display parts has layout information showing a layout relationship to be assumed with the other display parts, and wherein the layout information comprises identifiers of the display parts to be laid out in proximity.

34. An audio/video network control system comprising:

a controller operable to handle one or more sets of data pertaining to video, audio, or information and comprising a user interface; and a device operable to handle one or more sets of data pertaining to video, audio, or information, said device having content display parts that constitute an operation screen for said device, show contents handled by said device and list control codes specifying the contents, said device being connected to said controller via a transmission line, wherein said controller further comprises means for reading said display parts from said devices, wherein said controller is operable to use said control codes to direct the transmission and receipt of said contents to said devices in the operation of said content display parts by the user on said display screen, wherein at least one of said display parts has layout information showing a layout relationship to be assumed with the other display parts, and wherein the layout information comprises identifiers of the display parts to be laid out in proximity.

35. The network control system according to claim 34, wherein the content display parts have channel information indicating the channel of the transmission line over which the contents shown by said content display parts are transmitted and received.

36. A device for use in an audio/video network control system including a display screen and a controller unit operable to handle one or more sets of data pertaining to video, audio, or information and having a user interface, said device comprising:

means for holding content display parts that constitute an operation screen for said device, show the contents handled by said device, and list control codes that specify the contents, wherein said device is operable to handle one or more sets of data pertaining to video, audio, or information, wherein said device is operable to be connected to the controller unit via a transmission line, wherein at least one of said display parts has layout information showing a layout relationship to be assumed with the other display parts, and wherein the layout information comprises identifiers of the display parts to be laid out in proximity.

37. A controller for use in an audio/video network control system including a display screen and a device unit operable to handle one or more sets of data pertaining to video, audio, or information, said controller comprising:

a user interface;

means for reading, from the device via a transmission line, content display parts that constitute an operation screen for the device, show contents handled by the device, and list control codes that specify the contents, wherein said controller is operable to use the control codes to direct the transmission and receipt of the contents to the device in the operation of the content display parts by the user on the display screen, wherein at least one of the display parts has layout information showing a layout relationship to be assumed with the other display parts, and wherein the layout information comprises identifiers of the display parts to be laid out in proximity.

38. An audio/video network control system comprising:

a controller operable to handle one or more sets of data pertaining to video, audio, or information and comprising a user interface; and a device operable to handle one or more sets of data pertaining to video, audio, or information, said device having means for holding display parts that constitute an operation screen for said device, show contents handled by said device and list control codes specifying the contents and for holding content configuration set parts that show a set consisting of a plurality of content display parts, said device being connected to said controller via a transmission line, wherein said controller having means for reading said display parts and said content configuration set parts from said devices, wherein said content display parts being displayed on a display screen according to the information shown by said configuration set parts, wherein said controller using said control codes to direct the transmission and receipt of said contents to said devices in the operation of said display parts by the user on said display screen, wherein at least one of said display parts has layout information showing a layout relationship to be assumed with the other display parts, and wherein the layout information comprises identifiers of the display parts to be laid out in proximity.

39. The network control system according to claim 38, wherein the content configuration set parts have channel information indicating the channel of the transmission line over which the contents shown by said content display parts belonging to said content configuration set parts are transmitted and received.

40. A device for use in an audio/video network control system including a controller unit operable to handle one or more sets of data pertaining to video, audio, or information and having a user interface, said device comprising:

means for holding display parts that constitute an operation screen for said device, show the contents handled by said device, and list control codes that specify the contents and for holding content configuration set parts that show a set consisting of a plurality of said display parts, wherein at least one of said display parts has layout information showing a layout relationship to be assumed with the other display parts, and wherein the layout information comprises identifiers of display parts to be laid out in proximity.

41. A controller for use in an audio/video network control system including a display screen and a device unit operable to handle one or more sets of data pertaining to video, audio, or information, said controller comprising:

a user interface; and means for reading, from the device via a transmission line, display parts that constitute an operation screen for the device, that show contents handled by the device, and that list control codes that specify the contents, and content configuration set parts that show a set consisting of a plurality of the display parts, wherein the content display parts are displayed on a display screen according to the information shown by the configuration set parts, and wherein said controller is operable to use the control codes to direct the transmission and receipt of the contents to the device in the operation of the display parts by the user on the display screen, wherein at least one of the display parts has layout information showing a layout relationship to be assumed with the other display parts, and wherein the layout information comprises identifiers of display parts to be laid out in proximity.

42. An audio/video network control system comprising:

a controller operable to handle one or more sets of data pertaining to video, audio, or information and comprising a user interface; and a device operable to handle one or more sets of data pertaining to video, audio, or information, said device having means for holding display parts that constitute an operation screen for said device, show contents handled by said device and list control codes specifying the contents and for holding content menus that show functions of said device and codes that indicate one or a plurality of said display parts, said device being connected to said controller via a transmission line, wherein said controller unit further comprises means for reading said content menus and the display parts from the devices, wherein the content menus being displayed on a display screen, and wherein said controller is operable to use the control codes to direct the transmission and receipt of the contents to the device in the operation of the display parts by the user on the display screen, wherein at least one of said display parts has layout information showing a layout relationship to be assumed with the other display parts, and wherein the layout information comprises identifiers of display parts to be laid out in proximity.

43. The network control system according to claim 42, wherein the content menus have channel information indicating the channel of the transmission line over which the contents shown by the display parts included in the content menus are transmitted and received.

44. A device for use in an audio/video network control system including a display screen and a controller unit operable to handle one or more sets of data pertaining to video, audio, or information and having a user interface, said device comprising:

means for holding display parts that constitute an operation screen for said device, show the contents handled by said device, and list control codes that specify the contents and for holding content menus that show the functions of said device and codes that indicate one or a plurality of said display parts, wherein said device is operable to handle one or more sets of data pertaining to video, audio, or information, wherein said device is operable to be connected to the controller unit via a transmission line, wherein at least one display part has layout information showing a layout relationship to be assumed with the other display parts, and wherein the layout information comprises identifiers of the display parts to be laid out in proximity.

45. A controller for use in an audio/video network control system including a display screen and a device unit operable to handle one or more sets of data pertaining to video, audio, or information, said controller comprising:

a user interface; and means for reading, from the device via a transmission line, display parts that constitute an operation screen for the device, show contents handled by the device, and list control codes that specify the contents, and content menus that show functions of the device and codes that indicate one or a plurality of the display parts, wherein the content display parts are operable to be displayed on a display screen, wherein the control codes direct the transmission and receipt of the contents to the device in the operation of the display parts by the user on the display screen, wherein at least one of the display parts has layout information showing a layout relationship to be assumed with the other display parts, and wherein the layout information comprises identifiers of display parts to be laid out in proximity.

46. An audio/video network control system comprising:

a controller operable to handle one or more sets of data pertaining to video, audio, or information and comprising a user interface; and a device operable to handle one or more sets of data pertaining to video, audio, or information, said device having means for holding display parts that constitute an operation screen for said device and for holding content menus that show functions of said device and codes that indicate one or a plurality of said display parts, said device being connected to said controller via a transmission line, wherein said controller having means for requesting the right to use said devices, and wherein said devices transmitting a menu list containing identifiers for the display parts that constitute said menus of said devices to said controller when said devices grant said usage right, wherein at least one of said display parts has layout information showing a layout relationship to be assumed with the other display parts, and wherein the layout information comprises identifiers of display parts to be laid out in proximity.

47. The network control system according to claim 46, wherein, when there is a change in the display parts within the devices, said devices transmit said changed display parts to the controller.

48. The network control system according to claim 46, wherein, when the controller relinquishes the right to use the devices, said controller notifies said devices that the usage right is being relinquished, and said devices relinquish the channel of the in-use transmission line at the directive of said controller.

\* \* \* \* \*